(12) United States Patent
Shaji et al.

(10) Patent No.: US 8,117,230 B2
(45) Date of Patent: Feb. 14, 2012

(54) INTERFACES AND METHODS FOR GROUP POLICY MANAGEMENT

(75) Inventors: Ullattil Shaji, Sammamish, WA (US);
Rahul Gupta, Bellevue, WA (US);
Derek C. Y. Cheng, Issaquah, WA (US);
William J. Whalen, Seattle, WA (US);
Carey Tanner, Gold Bar, WA (US);
Mike A. Treit, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 47 days.

(21) Appl. No.: 12/464,108

(22) Filed: May 12, 2009

(65) Prior Publication Data

US 2009/0222884 A1    Sep. 3, 2009

Related U.S. Application Data

(63) Continuation of application No. 10/411,876, filed on Apr. 9, 2003, now abandoned.

(51) Int. Cl.
*G06F 17/30* (2006.01)
(52) U.S. Cl. .......................... 707/786; 707/787
(58) Field of Classification Search .................. 707/786, 707/787
See application file for complete search history.

(56) References Cited

U.S. PATENT DOCUMENTS

| | | | |
|---|---|---|---|
| 5,664,133 A | 9/1997 | Malamud et al. | |
| 6,088,451 A | 7/2000 | He et al. | |
| 6,160,550 A | 12/2000 | Nakajima et al. | |
| 6,199,082 B1 | 3/2001 | Ferrel et al. | |
| 6,236,996 B1 * | 5/2001 | Bapat et al. | 1/1 |
| 6,243,700 B1 | 6/2001 | Zellweger | |
| 6,247,020 B1 | 6/2001 | Minard | |
| 6,253,234 B1 | 6/2001 | Hunt et al. | |
| 6,389,589 B1 | 5/2002 | Mishra et al. | |
| 6,412,070 B1 | 6/2002 | Van Dyke et al. | |
| 6,466,932 B1 | 10/2002 | Dennis et al. | |
| 6,484,261 B1 | 11/2002 | Wiegel | |
| 6,519,647 B1 | 2/2003 | Howard et al. | |
| 6,567,808 B1 | 5/2003 | Eschelbeck et al. | |
| 6,578,192 B1 | 6/2003 | Boehme et al. | |
| 6,598,093 B1 | 7/2003 | Schmidt et al. | |
| 6,633,312 B1 | 10/2003 | Rochford et al. | |
| 6,651,096 B1 | 11/2003 | Gai et al. | |

(Continued)

OTHER PUBLICATIONS

Boswell, William, Inside Windows 2000 Server, published on Dec. 20, 1999.*

(Continued)

*Primary Examiner* — John E Breene
*Assistant Examiner* — Dennis Myint
(74) *Attorney, Agent, or Firm* — Lee & Hayes, PLLC

(57) ABSTRACT

A system and method for managing group policy objects in a network, including interfaces that allow access by programs or a user interface component to functions of a group policy management console that performs management tasks on group policy objects and other related objects. The interfaces abstract the underlying data storage and retrieval, thereby facilitating searching for objects, and providing the ability to delegate, view, change and permissions on those objects, and check and save those permissions. Modeling and other test simulations are facilitated by other interfaces. Other interfaces provide dynamic and interactive features, such as to convey progress and rich status messages, and allow canceling of an ongoing operation. Still other interfaces provide methods for operating on group policy related data, including group policy object backup, restore, import, copy and create methods, and methods for linking group policy objects to scope of management objects.

13 Claims, 17 Drawing Sheets

U.S. PATENT DOCUMENTS

| | | | |
|---|---|---|---|
| 6,718,386 | B1 | 4/2004 | Hanfland |
| 6,931,447 | B1 | 8/2005 | Hemstreet et al. |
| 6,947,991 | B1 | 9/2005 | Burton et al. |
| 6,950,818 | B2 | 9/2005 | Dennis et al. |
| 7,437,441 | B1 | 10/2008 | Drew et al. |
| 2002/0032706 | A1 | 3/2002 | Perla et al. |
| 2002/0035584 | A1 | 3/2002 | Scheier et al. |
| 2002/0087670 | A1 | 7/2002 | Epstein et al. |
| 2002/0095524 | A1 | 7/2002 | Sanghvi et al. |
| 2002/0133579 | A1 | 9/2002 | Bernhardt et al. |
| 2002/0178249 | A1 | 11/2002 | Prabakaran et al. |
| 2002/0184269 | A1 | 12/2002 | Imagou |
| 2002/0188603 | A1 | 12/2002 | Baird et al. |
| 2003/0041139 | A1 | 2/2003 | Beadles et al. |
| 2003/0041142 | A1 | 2/2003 | Zhang et al. |
| 2003/0076358 | A1 | 4/2003 | Nakajima et al. |
| 2003/0126232 | A1 | 7/2003 | Mogul et al. |
| 2003/0135665 | A1 | 7/2003 | Barker et al. |
| 2003/0154404 | A1 | 8/2003 | Beadles et al. |
| 2003/0182287 | A1 | 9/2003 | Parlanti |
| 2004/0003279 | A1 | 1/2004 | Beilinson et al. |
| 2004/0075680 | A1 | 4/2004 | Grace et al. |
| 2004/0083453 | A1 | 4/2004 | Knight et al. |
| 2004/0098263 | A1 | 5/2004 | Hwang et al. |
| 2004/0107274 | A1 | 6/2004 | Mastrianni et al. |
| 2004/0110118 | A1 | 6/2004 | Clark et al. |
| 2004/0111393 | A1 | 6/2004 | Moore et al. |
| 2004/0153511 | A1 | 8/2004 | Maynard et al. |
| 2004/0204949 | A1 | 10/2004 | Shaji et al. |
| 2004/0215627 | A1 | 10/2004 | Whalen et al. |
| 2004/0215649 | A1 | 10/2004 | Whalen et al. |
| 2004/0215797 | A1 | 10/2004 | Hadley |
| 2005/0005233 | A1 | 1/2005 | Kays et al. |
| 2005/0108627 | A1 | 5/2005 | Mireku |
| 2005/0138137 | A1 | 6/2005 | Encarnacion et al. |
| 2005/0204309 | A1 | 9/2005 | Szeto |
| 2006/0122937 | A1 | 6/2006 | Gatto et al. |
| 2006/0288111 | A1 | 12/2006 | Katinsky et al. |
| 2007/0250840 | A1 | 10/2007 | Coker et al. |
| 2008/0109472 | A1 | 5/2008 | Underwood et al. |

OTHER PUBLICATIONS

Christopher-Knight, "Managing with Group Policy and the Windows Server 2003 Policy Management", Feb. 2003, retrieved from the Internet:URL<http://www.sans.org /reading_room/whitepapers/windows/ policy-windows-server-2003-group-policy-management-console_1374 >.).*

Fullerton, et al., "Special Edition Using Microsoft Active Directory", Published in 2001.

William Boswell, "Inside Windows Server", News Riders Publishing, Published on Dec. 20, 1999.

"Step-by-Step to Understanding the Group Policy Feature Set", Retrieved at <<http://www.microsfot.com/technet/prodtechnol/windows2000serv/howto/grpolwt.mspx>>.

Microsoft Developers Network (MSDN), "Setting Advanced Options on a WMI Event Filter in Server Explorer", Retrieved at <<http://msdn.microsoft.com/library/default.asp?url=/library/en-us/wmise/ wmitskSettingAdvancedOptionsOnWMIEventFilterInServerExplorer.asp>>.

"Administering Group Policy with the GPMC", www.microsoft.com, Retrieved at <<http://www.microsoft.com/windowsserver2003/gpmc/gpmcwp.mspx>>.

"ACM Database Search", The ACM Digital Library, Retrieved at <<file://C:\DOCUME~I\dmyint\LOCALS~I\Temp\LOC9QFTR.htm>>, Apr. 18, 2008, p. 1.

"Google Scholar Database Search", Google Scholar, Retrieved at <<http://scholar.google.com/scholar?q=interface+entry+point+&hl=en&lr=&btnG=Search>>, Apr. 18, 2008, p. 1.

"IEEE Database Search", IEEE Xplore, Retrieved at <<file://C:\DOCUME~I\dmyint\LOCALS~I\Temp\7IU92FK1.htm>>, Apr. 18, 2008, p. 1.

Boswell, "Chapter 16 Managing the User Operating Environment", Inside Windows 2000 Server, Managing the User Operating Environment > Configurating and User Profiles, retrieved on Dec. 15, 2008 at <<http://proquest.safaribooksonline.com/1562059297/ch16, 20 pages.

Boswell, "Chapter 18 Recovering from System Failures", Inside Windows 2000 Server, Recovering from System Failures> Functional Description of Windows Backup, retrieved on Dec. 15, 2008 at <<http://proquest.safaribooksonline.com/1562059297/ch16>>, 13 pages.

Boswell, "Chapter 8 Desinging Windows 2000 Domians", Inside Windows 2000 Server, Designing Windows 2000 Domains > Design Objectives, retrieved on Dec. 15, 2008 at <<http://proquest.safaribooksonline.com/1562059297/ch08>>, 3 pages.

Boswell, "Design Strategies for Lower Directory Leves", Inside Windows 2000 Server, Designing Windows 2000 Domains > Design Strategies for Lower Directory Levels, retrieved on Dec. 15, 2008 at <<http://proquest.safaribooksonline.com/1562059297/ch08>>, 10 pages.

Boswell, "DNS and Active Directory Namespaces", Inside Windows 2000 Server, Designing Windows 2000 Domains > DNS and Active Directory Namespaces, retrieved on Dec. 15, 2008 at <<http://proquest.safaribooksonline.com/1562059297/ch08>>, 7 pages.

Boswell, "Initial Design Strategies", Inside Windows 2000 Server, Designing Windows 2000 Domains > Initial Design Strategies, retrieved on Dec. 15, 2008 at <<http://proquest.safaribooksonline.com/1562059297/ch08>>, 6 pages.

Boswell, "INSIDE Windows 2000 Server", New Riders Publishing, 1999, Excerpts from p. 173 to p. 1141 (Reference to 173, 261, 297, 339, 496, 497, 1122-1127, 1132, 1133, 1140, 1141), 18 pages.

Boswell, "INSIDE Windows 2000 Server", New Riders Publishing, 1999, Excerpts from p. 343 to p. 925 (Reference to 343, 357, 359, 386, 387, 479, 917-925), 19 pages.

Boswell, "INSIDE Windows 2000 Server", New Riders Publishing, 1999, Excerpts from p. 505 to p. 1148 (Pages are not in numerical order; The following pages are reference: 505, 649, 1114, 1122-1125, 1141, 1142, 1146, 1147, 387, 1134, 1135, 1138, 1139), 19 pages.

Boswell, "Managing User Environments with Group Policies", Inside Windows 2000 Server, Managing the User Operating Environment > Managing User Environments with Group Policies, retrieved on Dec. 15, 2008 at <<http://proquest.safaribooksonline.com/1562059297/ch16>>, 42 pages.

Boswell, "Placing Special-Function Servers", Inside Windows 2000 Server, Designing Windows 2000 Domains > Placing Special-Function Servers, retrieved on Dec. 15, 2008 at <<http://proquest.safaribooksonline.com/1562059297/ch08>>, 6 pages.

Boswell, "Strategies for Upper-Level Designs", Inside Windows 2000 Server, Designing Windows 2000 Domains > Strategies for Upper-Level Designs, retrieved on Dec. 15, 2008 at <<http://proquest.safaribooksonline.com/1562059297/ch08>>, 12 pages.

Swift et al., "Improving the Granularity of Access Control for Windows 2000", ACM Transactions of Information and System Security (TISSEC), vol. 5, No. 4, Nov. 2002, 44 pages.

Office Action for U.S. Appl. No. 12/850,853, mailed on Jul. 20, 2011, Alicia M. Lewis, "Support Mechanisms for Improved Group Policy Management User Interface" 20 pages.

Office Action for U.S. Appl. No. 12/850,853, mailed on Nov. 21, 2011, William J. Whalen, "Support Mechanisms for Improved Group Policy Management User Interface", 23 pgs.

* cited by examiner

INTERFACES AND METHODS FOR GROUP POLICY MANAGEMENT

CROSS-REFERENCE TO RELATED APPLICATIONS

The present invention is related to the following copending U.S. patent applications, entitled "Support Mechanisms for Improved Group Policy Management User Interface" Ser. No. 10/410,887, "Method and System for Representing Group Policy Object Topology and Relationships" Ser. No. 10/410,883, and "Method and System for Implementing Group Policy Operations" Ser. No. 10/410,865, filed concurrently herewith. Each related application is assigned to the assignee of the present patent application and hereby incorporated by reference in its entirety.

FIELD OF THE INVENTION

The invention relates generally to computer systems and networks, and more particularly to policies used in computer networks.

BACKGROUND OF THE INVENTION

In contemporary computing networks, network administrators define policies for users and computer systems of that network. With a Microsoft Windows®-based operating system, administrators use Group Policy technology to define the state of users' work environment, and rely on the system to enforce the defined policies. In general, those policies are then applied to determine how the various computer systems are configured. For example, the configuration that a user sees when logged onto any computer system of the network depends on the policy settings for that machine combination with the policy settings for that user.

In such a network, Group Policy can be used to specify many of the settings for a user and computer, including registry-based policy settings used to configure and specify behavior of the operating system and optionally application programs based on settings in various computer systems' registries, and script-related policy settings control scripts for computer startup and shutdown, and user logon and logoff. Group policy can also specify particular software programs for groups of users and/or machines, as Group Policy includes settings for centrally managing the installation, updates, and removal of application programs and components. Security options are also provided by policy settings, e.g., for local computer, domain, and network security settings. Folder redirection options, which allow administrators to redirect users' special folders to the network, also may be managed via Group Policy, as can Internet Explorer Maintenance, which is used to manage settings related to Internet Explorer and Remote Installation Services options, which are used to manage client configuration options that users see when performing Remote Installation Services-based installs. Internet Protocol Security Settings and Wireless settings can also be deployed through Group Policy, and public key policy settings, as well as software restriction policies can also be managed.

To apply and enforce the policy in a Windows®-based operating system, the Group Policy settings that administrators create are contained in group policy objects (GPOs), which in turn are applied to one or more scopes of management, such as a site, domain, or organizational unit (OU) in Active Directory®. A site, domain, or organizational unit may also be referred to as a scope of management, or SOM. In this manner, administrators centrally apply policy to users and computers of those sites, domains, and organizational units. Policy settings from each of these different hierarchical levels are combined and applied to the policy recipients. Any conflicting policy among the levels is resolved via various rules, as generally described in U.S. Pat. No. 6,466,932, herein incorporated by reference.

While Group Policy thus greatly simplifies network administration, group policy objects are not simple objects, but rather virtual objects comprising complex pieces of setting definitions that are stored on the domain, e.g., in an Active Directory® service objects and attributes and in file system (sysvol) files. In general, each group policy object comprises multiple subcomponents, typically including a collection of many files, other objects and attributes, that reference one another in various ways. Group policy objects are thus relatively difficult to work with.

At the same time, current tools to assist the administrators in managing group policy are fairly varied and generally difficult to use. Moreover, the mechanisms provided by these tools are not accessible programmatically (e.g., through code such as scripts or the like). Additionally, visualization of how policy fits into the network hierarchy is relatively limited, needed information is often difficult to discover and/or access, and delegation of access rights to the objects that provide the policy is difficult to use. Other difficulties arise in locating group policy objects, reading them, and browsing related components such as filters. In sum, better mechanisms for working with group policy, including those with programmatic access, would significantly benefit network administrators and other users that deal with group policy.

SUMMARY OF THE INVENTION

Briefly, the present invention provides a system and method implemented in various object interfaces and methods, for managing policies throughout a network. Such policies are arranged as group policy objects, which generally comprise a collection of files, objects and attributes that exist at various locations in the network. Policy may correspond to policy settings in the group policy objects.

To manage policies, various tools and mechanisms are integrated into a group policy management console. In general, the group policy management console provides a number of mechanisms and functions, which are accessible via exposed interfaces and methods and properties exposed on those interfaces. A user interface and/or an external executable program may call the methods via the interfaces.

Methods and mechanisms provide the ability to perform searches for policy-related objects, work with access permissions, backup and restore group policy objects, and import, export (which may be achieved via backup) and copy group policy objects. Other interfaces and their exposed methods allow administrators to perform various policy-related management tasks including browsing and editing high-level attributes of a group policy object, (e.g., name of the group policy object, group policy object status, WMI (Windows Management Instrumentation) filter link and so forth), browsing and linking of group policy objects to scope of management (SOM) objects (e.g., site, domain or organizational unit container objects), understanding the relative ordering of links of group policy objects on the SOMs, and delegating rights to link group policy objects on the SOMs. Still other tasks include delegating rights, for example to read, edit, edit/delete/modify security on group policy objects or to create group policy objects, performing security filtering and filtering based on WMI (Windows Management Instrumentation) filters, searching for SOMs and/or group policy objects based on different criteria, browsing and linking WMI filters and delegating rights to edit a WMI filter, performing diagnostic tasks, such as looking at the resultant set of policy (RSOP) data applicable to a machine and a user, scripting of RSOP data generation, performing modeling of group policy applications on the client machines, performing backup, copy, import or restore operations on group policy objects, and generating/saving reports of the group policy objects and of resultant set of policy data.

In general, these interfaces abstract the underlying data storage and retrieval, as well as providing the ability to change permission related data. As script calls or user interface calls are received at the group policy management interfaces, the interfaces read and write data from and to various group policy-related locations in the network, including the directory service, the sysvol, management instrumentation filters such as WMI (Windows Management Instrumentation) filters and the file system, wherein WMI filters are objects that exist inside the operating system and are separate from the group policy objects and the SOM objects.

The GPM interface is the main entry point provided to the interfaces and methods provided by the group policy management console. This interface is cocreatable and has methods that allow a caller to create interfaces targeted at more specific functionality provided by group policy management interfaces. For example, the GPM interface includes a method that allows the caller to create an interface targeting domain information by specifying the domain name and optionally the domain controller to use. Similarly the GPM interface has a method that allows access to sites' specific information by specifying the forest and optionally the domain and domain controller to use. Backups can also be accessed by creating an interface from GPM by specifying the backup directory.

These interfaces allow an interface to bind directly to the object if the identity of the object is known. If the identity is not known, the group policy management interfaces allows a search to be performed, including narrowing the search based on additional criteria, if known. For example, if a group policy object's identity is known, the interfaces can be bound directly to the group policy object using the identity. If the identity is not known, the existing elements in the parent scope can be enumerated. If some details about an object are known, those details can be passed to an interface that is invoked to narrow a search to a subset collection of objects satisfying search criteria.

For group policy management interfaces that take constants as parameters to control the operation being performed, the group policy management console exposes an interface that exposes properties that return the relevant constant values. For example, this interface is useful for scripts which are unable to use constants defined in a header file, unlike higher-level programming languages such as C/C++.

For searching for objects by criteria, each criterion comprises three primary parts, including a search property that specifies a property to which the search corresponds, a search value that needs to be matched by the specified property, and a search operation that comprises a constant indicating what sort of matching needs to be done. Supported search operations include Equals, whereby the search returns results for when the specified property matches the specified value, or NotEquals, whereby the search returns results for when the specified property does not match the specified value. Other supported search operations include Contains, which returns results when the specified property contains the specified value, and NotContains, which returns results when the specified property does not contain the specified value.

The group policy management interfaces also abstract the management of security descriptors, allowing simplified delegation of permissions (e.g., apply, read, edit and so forth) on group policy objects to control access rights to group policy objects, and WMI Filters. Delegation of SOM permissions is also enabled, such as for linking group policy objects to a given SOM, modeling the resultant set of policy for objects in a given SOM, and generating actual resultant set of policy data for objects in a given SOM. Delegation of group policy object creation rights and WMI filter creation rights is also facilitated.

In general, the abstraction facilitates management of group policy delegation while isolating the detailed intricacies of the security descriptor.

The group policy management interfaces create the abstractions by loading and mapping one or more security descriptors. To load, the group policy management console queries the directory service and receives the security descriptor or descriptors associated with the specified object or objects. The group policy management console then attempts to create a permissions table that is used for returning the permissions data to the user, and for manipulating the security descriptor, which may then be saved.

In the permissions table each row corresponds to a trustee (a computer, user or group in a domain), and each column in the permission table corresponds to a directory service permission. The cells contain data regarding the access state (Allowed, Denied, not configured), and indicate whether inherited, whether inheritable, and whether in a dirty state (to handle modifications). Checks for well-formed permissions may be performed to establish that all of the permission bits for a given permission are either allowed or denied, and that the permission present matches one of the predefined levels and there are no additional permissions. Note that in general herein, "permission" may be used to refer to an abstract group policy management permission, while "permission bit" may be used to refer to a low-level directory service permission.

A group policy object includes two classes of permissions, namely permissions related to delegation, such as read, edit and EditSecurityAndDelete, and apply permissions. For each row (trustee) in the permissions table, the delegation permissions are evaluated, with EditSecurityAndDelete evaluated first, followed by edit and read permissions to determine whether the sets of permissions are well formed. The apply permissions are likewise evaluated. A similar checking process for SOMs and WMI filters, and for creation permissions for group policy objects and WMI filters, is also provided. Updated permissions may be saved back into the object.

Other interfaces provided by the group policy management console provide dynamic and interactive features, such as to convey progress and status messages to the administrator, and allow canceling of an ongoing operation. The methods of these interfaces may be synchronously or asynchronously invoked. The status messages comprise a rich description of the state (e.g., progress of the operation) while performing the operation, and may provide a description of any issue encountered, and details about the operation that was being attempted or performed. Status messages also indicate the object (e.g., within the group policy object) that was being manipulated. Status messages may be informational, warning or error messages.

Other advantages will become apparent from the following detailed description when taken in conjunction with the drawings, in which:

DETAILED DESCRIPTION

Exemplary Operating Environment

Figure 1:
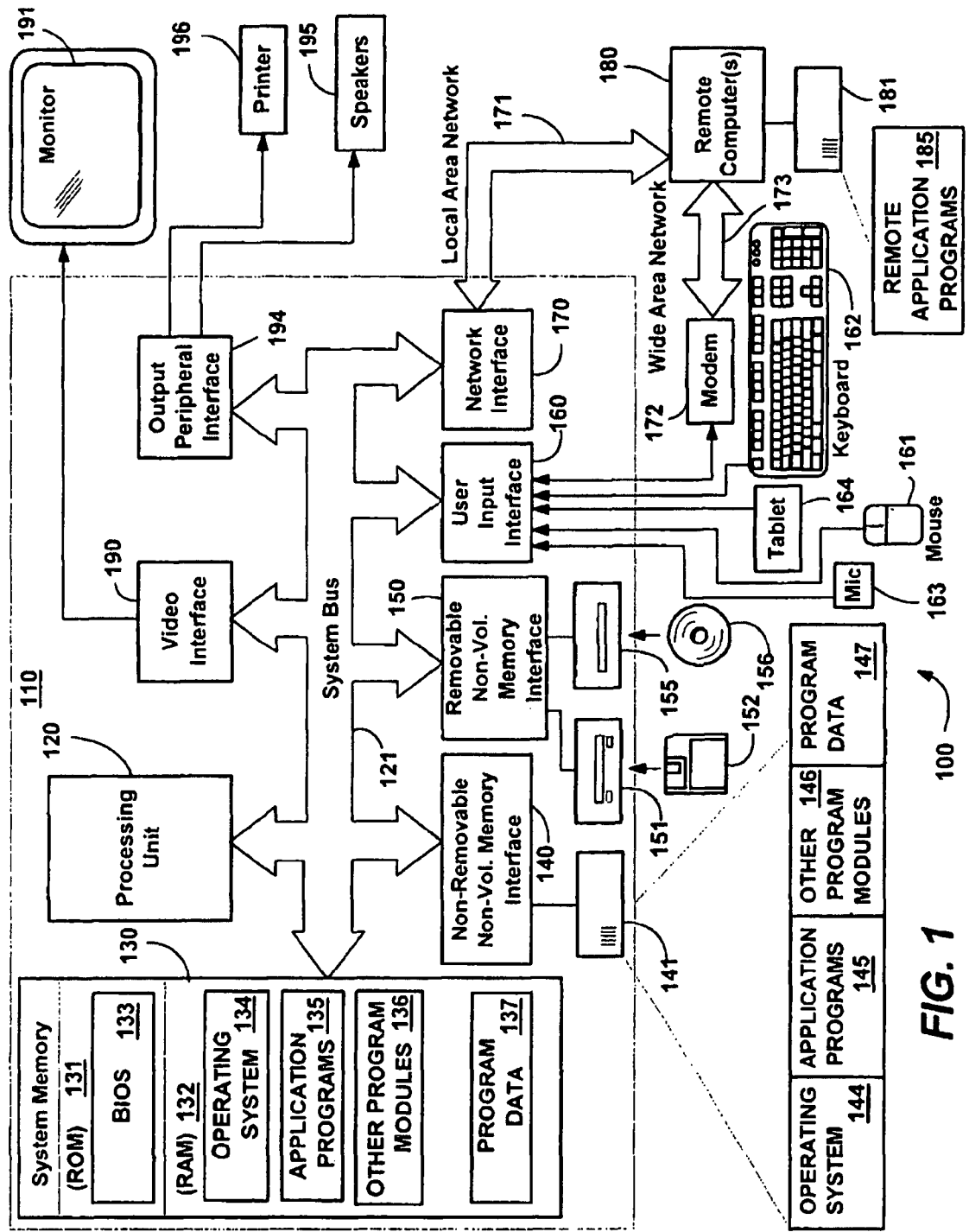
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Group Policy Objects

In general, the present invention provides a method and system for operating on policies implemented throughout a network, wherein those policies are defined and arranged (e.g., by one or more administrators) into group policy objects. Group policy objects generally comprise a collection of files, objects and attributes that exist at various locations in the network. Such policy may correspond to policy settings in the group policy objects, including registry-based settings, scripts, (computer startup and shutdown scripts, and user logon and logoff scripts), redirection of folders that contain user documents and settings, application deployment (software installation), security settings, public key policy settings, software restriction policies, IP security, remote installation services, and/or Internet Explorer Maintenance. Indeed, group policy objects may be extended to include virtually any desired information, as long as a client-side (or other) extension that uses the policy object is capable of interpreting and/or handling the information therein.

In an example implementation described herein, the system and method of operating on group policy utilize a highly flexible architecture of the Microsoft Windows® operating system, in which an administrator links the group policy objects to the containers, which comprise hierarchically organized directory objects representing sites, domains and organizational units, with policy recipients (e.g., users and computers) being associated with those containers. In this implementation, generally represented in FIG. 2, the group policy objects preferably utilize a Windows® directory service (e.g., in components 201 and 202), known as Active Directory®, which stores information about the objects of a domain, and makes this information easy for administrators to access, find and apply via a single, consistent and open set of interfaces. Note that each domain controller has a directory service component, with data replicated to other directory service components, but for purposes of the examples the directory service will be described with reference to the directory service component 202. Thus, for example, with the Active Directory® service 202, administrators can access resources anywhere on the network. Similarly, administrators have a single point of administration for the objects on the network, which can be viewed in a hierarchical structure.

Each domain controller also has a sysvol component that is similarly replicated, typically for maintaining larger sets of data (relative to the size of the sets of data in the directory service). Note that for purposes of explanation herein, the user performing such group policy object-related tasks will be referred to as an administrator, although it is understood that any user with appropriate security privileges can perform these tasks, even if not actually designated as an administrator.

Figure 2:
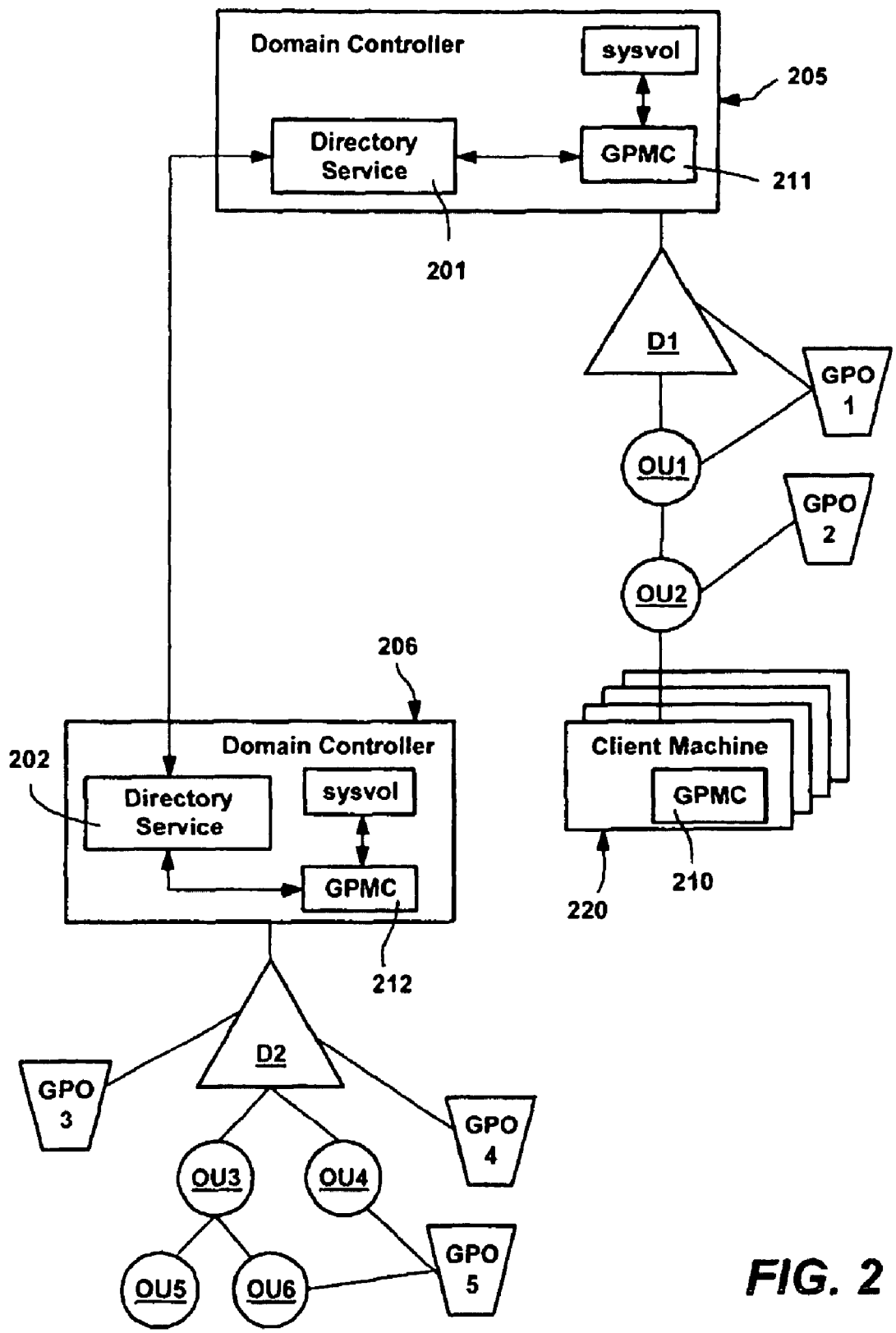
FIG. 2 is a block diagram generally representing a network including a directory service and domain controllers with group policy objects capable of being operated on in accordance with an aspect of the present invention.
Figure 3:
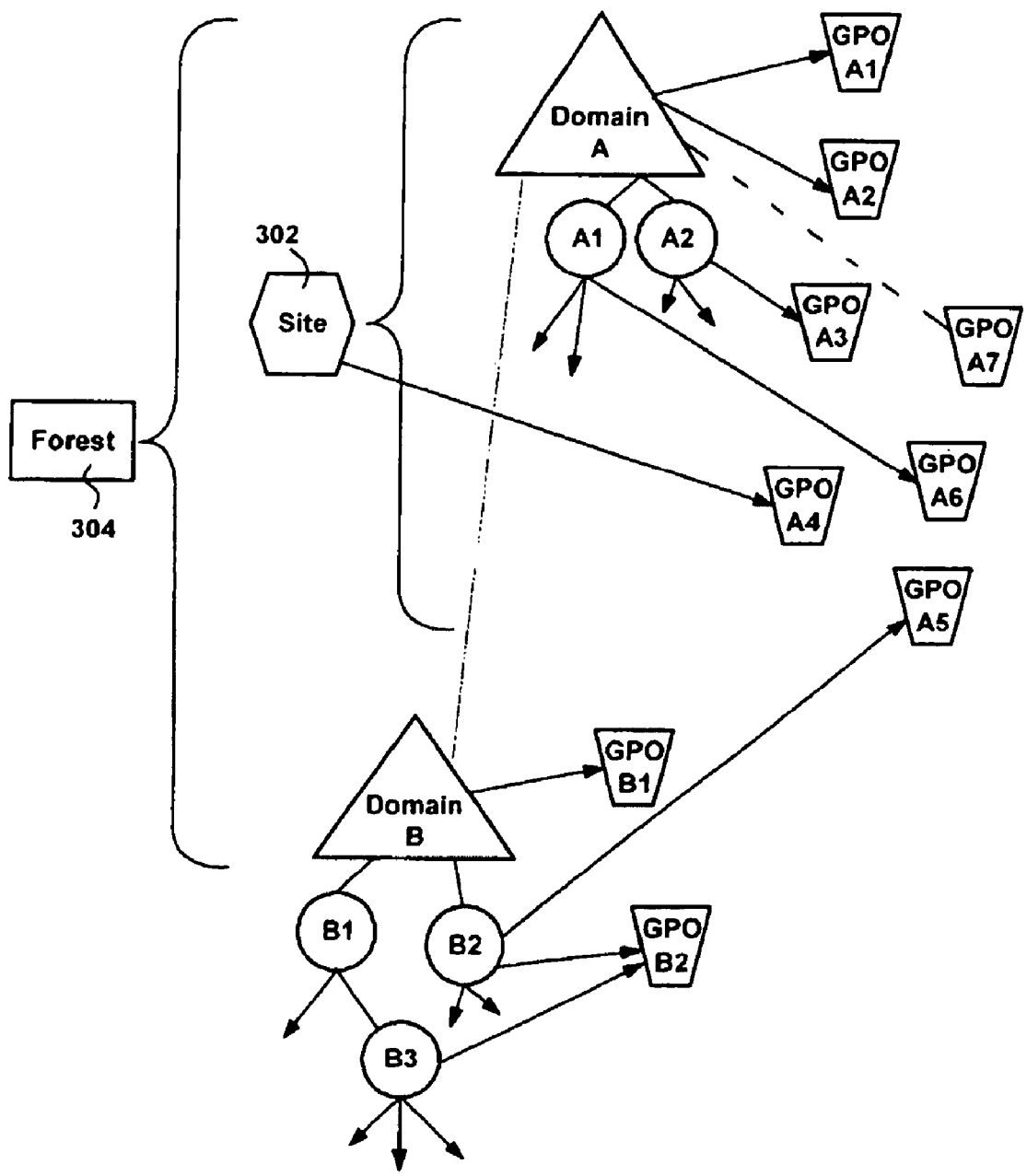
FIG. 3 is a representation of a forest, site, domains and organizational units in network with associated group policy objects capable of being operated on in accordance with an aspect of the present invention.

A core unit in the Active Directory® service is a domain, shown via domains D1 and D2 in FIG. 2, which are each controlled by one or more domain controllers, shown as the domain controller 205 and the domain controller 206, respectively. Note that there may be more than one domain controller per domain. Many of the objects of a network exist within a domain. As generally represented in FIG. 3, a single domain can span multiple physical locations or sites (e.g., 302), and domains can be grouped together into a forest 304, typically in some logical grouping as determined by an administrator. A site 302 comprises one or more ranges of IP addresses of which computers can be a member, often a grouping of computers related by some geographical area.

Organizational units (e.g., OU1-OU6 in FIG. 2) are a type of directory object included within domains that are hierarchically organized logical containers into which users, groups, computers, and even other organizational units may be logically placed. Group policy objects e.g., GP1-GP5 in FIG. 2) are stored in (exist in) a domain, and can be applied to one or more sites, domains, and/or organizational units. Note that a site, domain, and/or organizational unit may be referred to as a scope of management, or SOM. It will be readily appreciated that although described herein with reference to Microsoft Windows®, the Active Directory® service, sites, domains, organizational units, and so forth, the present invention is not limited thereto, nor even to directory containers in general, but rather is applicable to any types of policy objects and/or scoping mechanisms that require management in a network.

To apply policy to policy recipients (users and machines) of the network, group policy objects may be created via a group policy management console (e.g., 210, 211 or 212 in FIG. 2), or similar program with a suitable user and/or programmatic interface. Note that as represented in FIG. 2, an instance of the group policy management console may be run from essentially any machine in the network that is capable of running a management program, including client machines (e.g., 220) or the domain controllers 205 and 206. Once created, group policy objects may then be linked to an appropriate container or containers (e.g., objects representing a scope of management, such as sites, domains and organizational units) that are arranged in a hierarchy with which the policy recipients are associated. For example, any group policy management console 210, 211, 212 or similar user interface tool allows administrators to selectively associate the group policy objects GPO1 and GPO2 with directory container objects D1, OU1 and OU2 in FIG. 2. Note that as represented by the dashed line from Domain A to the group policy object GPOA7 in FIG. 3, a group policy object may exist in a domain but not be linked to a container.

Each group policy object (e.g., GPO3 of FIG. 2) may be composed of group policy information maintained in many locations in the network, including objects and attributes stored in the Active Directory® service 202, and collections of system volume (sysvol) files, wherein the sysvol comprises a folder on a domain controller (e.g., 206), such as used to replicate file-based data among domain controllers. The policy information may include one or more pointers to another location (e.g., a data file on a remote share) where some or all of the actual policy information (or a further pointer thereto) is maintained. Policy information also may be stored in a virtual registry (e.g., a copy of some or all of a client machine's registry maintained in a file on the server, specifically in the group policy template), that may be used by an extension to put information into the client-machine's registry.

Because many group policy objects can apply to one policy recipient, such as via a domain association or one or more organizational units to which the policy recipient belongs, for each policy recipient, the policy settings maintained in the policy objects may be selectively accumulated in an order of precedence, inherited from the group policy objects associated with one or more higher-up organizational units, a site, and/or the domain, and/or blocked from being inherited. In general, to accumulate policy for a policy recipient, policies are applied in a manner such higher policies that are enforced take precedence by hierarchical order, while higher non-enforced policies may be overridden by lower-level policies.

Group Policy Management

The present invention is generally directed towards managing group policy in a network with different users and computers, such as in an enterprise. To this end, the present invention provides a number of tools and mechanisms for managing group policy objects and related components, which in one implementation are integrated into the group policy management console (e.g., 212 of FIG. 2) that unifies group policy management across a network. In this implementation, the group policy management console comprises a new Microsoft® Management Console (MMC) snap-in and a set of programmable interfaces for managing group policy, e.g., in domains using Microsoft Active Directory®.

In general, the group policy management console 212 integrates the existing group policy functionality exposed in various tools into a single console, and further provides a number of new functionalities, including a user interface 402 (FIG. 4) that facilitates group policy management, and a reporting mechanism 404 for reporting group policy object settings and resultant set of policy (Resultant set of policy) data 406. Among the various interface-accessible methods, modifications are supported, as is read-only access to settings within group policy objects, which was heretofore unavailable. The group policy management console 212 also provides mechanisms (methods) to operate on group policy objects, including backup and restore operations on group policy objects, import and export operations on group policy objects, and copy (and paste) operations on group policy objects. These and other group policy management console mechanisms are further described in the aforementioned copending patent application entitled "Method and System for Implementing Group Policy Operations."

In accordance with an aspect of the present invention, a number of programmable interfaces 408 having methods are provided to facilitate group policy management, including providing the underlying functionality of the user interface 402 that administrators use to manage policy, and also providing access to this functionality via scripting 410. These interfaces are dual interfaces, for example capable of handling "C++"-type function calls initiated from the user interface 402 or other program, and script-initiated calls to object (e.g., COM) methods. Note that the interfaces will primarily be described herein with respect to COM object interfaces, however the functions described herein apply regardless of how those functions are actually invoked.

As will be understood, the interfaces 408 allow administrators to perform various policy-related management tasks including browsing and editing high-level attributes of group policy objects in a domain, browsing and linking of group policy objects to scope of management (SOM) objects (e.g., site, domain or organizational unit container objects), understanding the relative ordering of links of group policy objects on the SOMs, and delegating rights to link group policy objects on the SOMs. Other tasks performed via the interfaces include delegating rights to edit group policy objects, performing security filtering and filtering based on management instrumentation filters, such as WBEM-based management instrumentation filters (e.g., WMI (Windows Management Instrumentation) filters), searching for SOMs and/or group policy objects based on different criteria, creating group policy objects and WMI filters and delegating creation permissions, browsing and linking management instrumentation filters and delegating rights to edit a management instrumentation filter. Note that as used herein, such management instrumentation filters will be referred to as WMI filters, although it is understood that WMI filters are only an example, and that other filters are equivalent. Still other tasks include performing diagnostic tasks, such as looking at the actual resultant set of policy data applicable to a machine and a user, performing modeling of resultant set of policy, performing backup, copy, import or restore operations on group policy objects, and saving reports of the group policy objects or resultant set of policy data. As described above, these tasks are accomplished via a user interface 402 or via programmatic mechanism such as script 410 that connects to the interfaces 408 of the group policy management console 212.

Interface Model

In one example implementation described herein, the group policy management interfaces 408 comprise component object model (COM)-based interfaces, including exposed scriptable interfaces. In general, these interfaces abstract the underlying data storage and expose the logical properties to the clients of the APIs, using properties or methods. Properties are typically atomic operations that allow simple access and/or modifications to a single logical property, while methods support more complicated operations.

Figure 5:
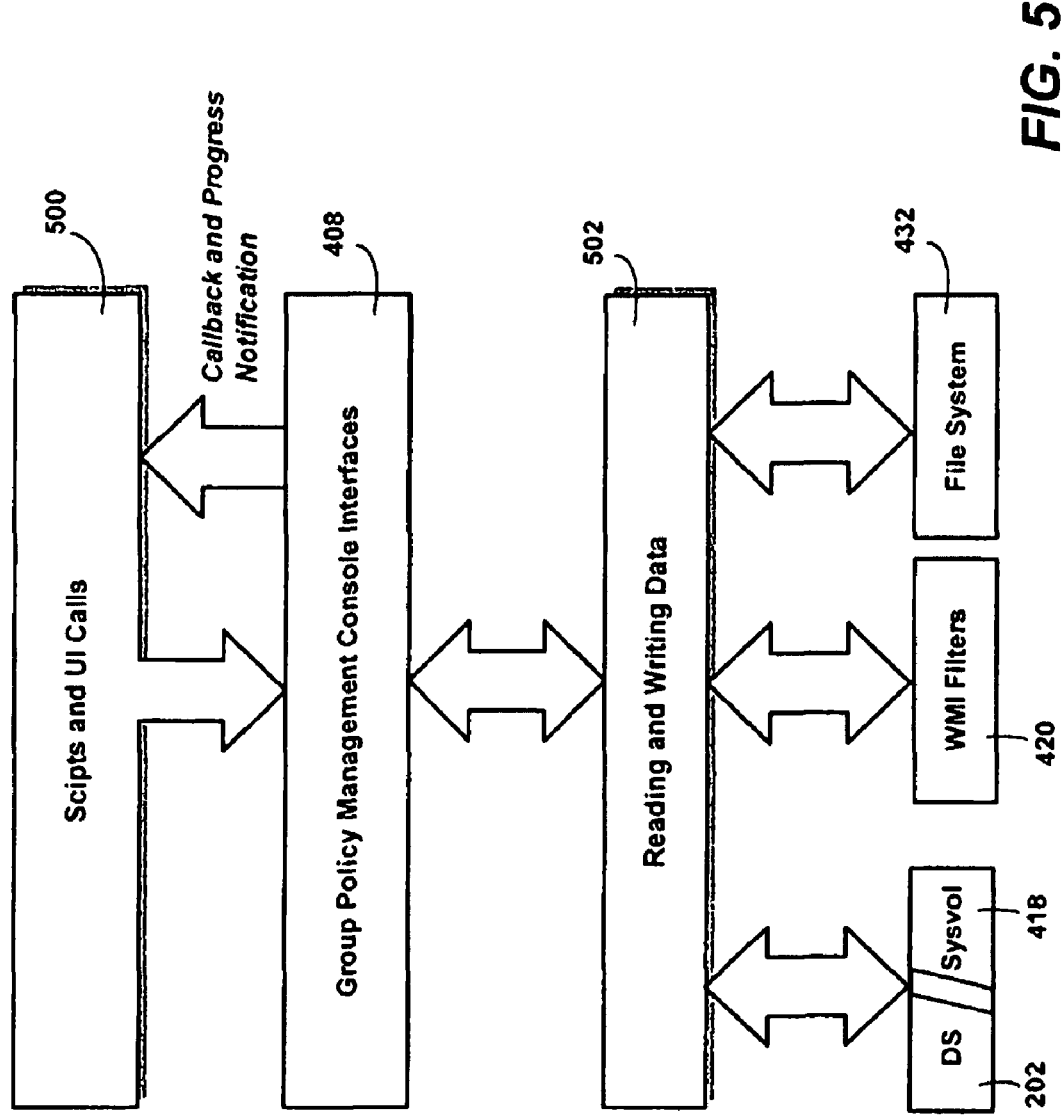
FIG. 5 is a representation of the general flow of data for calls to the interfaces in accordance with an aspect of the present invention.

FIG. 5 provides a general representation of the flow of the operations with respect to the interfaces. In general, external program-initiated (for example including script) calls and user interface calls 500 are received at the group policy management interfaces 408. In turn, those interfaces read and write data 502 from and to various locations in the network, including the directory service 202, the sysvol 418, WMI (Windows Management Instrumentation) filters 420 and the file system 432. Data is also read from the registry. As used herein, such data-related operations that are performed on group policy objects, SOMs and WMI filters will be generally referred to as operations performed on "group policy related data."

Figure 6:
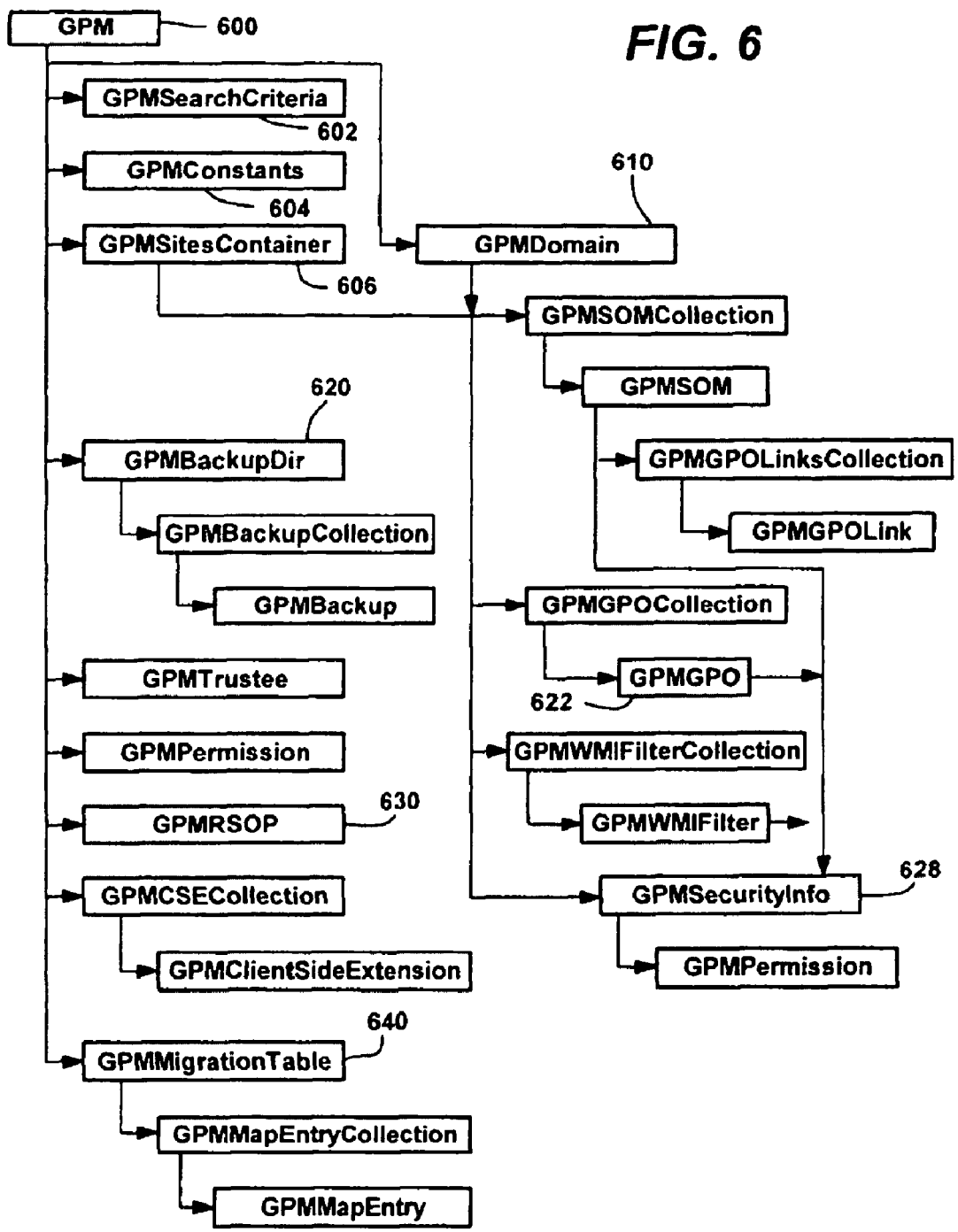
FIG. 6 is a representation of some of the available interfaces of the group policy management console and their relationships to one another, in accordance with an aspect of the present invention.

As represented in FIG. 6, and in the attached APPENDIX A, the group policy management console interface model provides a GPM (or IGPM) interface 600. Note that for readability herein and in FIG. 6, the "I" customarily preceding each interface will be omitted, e.g., the "IGPM" interface will be referred to as the "GPM" interface 600. The GPM interface 600, in a COM implementation, is the only cocreatable interface provided, and is the only entry point to the other group policy management interfaces. Interfaces are organized in a hierarchical manner with child interfaces creatable from the parent interface. Child interfaces created in such a manner inherit some of the properties defined in the parent, e.g., the Domain and the domain controller to be used by child interfaces. Note that the hierarchy provides benefits (beyond simple organization), because once the binding is made at the parent interface, only one domain controller is to be called for getting and setting information for any subsequent operations, which will then be consistent (other domain controllers will not necessarily have the same data due to replication issues). Further, note that only objects that involve a domain controller have such issues. The GPM interface 600 is essentially stateless, and provides the basis for accessing other interfaces that are specifically targeted on the object that are being accessed. The GPM interface also provides some utility methods that can be subsequently used in other methods, as described (along with other interfaces' methods) in the attached APPENDIX B.

The group policy management APIs 408 provide mechanisms to bind an interface pointer to an object. To this end, the GPM interface 600 exposes binding interfaces having methods that allow specific bindings between objects and interfaces. Note that properties of each specific binding are inherited by any subsequent interface creations from these interfaces. The binding interfaces that are exposed include GPMDomain 610, which is bound to a specific domain (e.g., D2 of FIG. 2) and a domain controller 212 within the domain.

The GPMDomain interface pointer 610 is used for further access to objects within the domain, such as when looking for SOMs and group policy objects within the domain. For example, if a group policy object's identity is known, the interfaces can be bound to the group policy object using that identity. To this end, using a GetGPO method of the GPMDomain interface 610 while specifying the group policy object's identifier gets a GPMGPO interface 622 bound to that specified group policy object. If the identity is not known, the existing elements in the parent scope can be enumerated based on certain search criteria. For example, on the GPMDomain interface 610, calling a "SearchGPOs" method with no search criteria obtains all of the group policy objects in the domain. If some details about an object are known, those details can be passed to an interface that is invoked to get a collection of objects satisfying search criteria. For example, given search criteria specifying the displayname of the group policy object, the SearchGPOs method of the GPMDomain interface 610 finds all of the group policy objects in the domain that have the specified name. Additional aspects of searching for group policy objects are described below.

Some of the group policy management interfaces take constants as parameters to control the operation being performed. For example, constants provided in a search operation specify the kind of search that needs to be done. These constants enable the full functionality of the group policy management interfaces to be accessed. To work with constants, e.g., to provide access to them from programs such as scripts and other executable code, the group policy management console 212 exposes the GPMConstants interface 604. The GPMConstants interface 604 exposes properties that return the relevant constant values, whereby script authors do not have to try to figure out constant values or use a cumbersome mechanism to introduce constants into their scripts.

As represented in FIG. 6, other interfaces are provided, including the GPMSitesContainer interface 606, which comprises a binding for sites' data in a given forest and domain controller. The GPMBackupDir interface 620 is called to open a specified directory as a backup directory in the file system 432, wherein a backup directory is used as a special location for backing up group policy objects, and for managing (e.g., searching and retrieving) the backed-up group policy objects stored in the backup directory. The GPMMigrationTable interface 640 provides a binding to a persistent migration table, or provides a mechanism to create and save a migration table, which is a file of data structures (e.g., an XML file) comprising mappings for migrating group policy objects between different domains with appropriate conversions, e.g., so that security principals and UNC paths are transferred to the new domain in a meaningful manner. Backup operations, the backup directory and migration tables are further described in the aforementioned copending patent application entitled "Method and System for Implementing Group Policy Operations." The GPRRSOP interface 630 binds to a given resultant set of policy (RSOP) namespace or a given mode of resultant set of policy (planning or logging).

In any given domain, there may be a relatively large number of group policy objects, e.g., on the order of hundreds or thousands. As a result, it is often useful to locate a subset of group policy objects that satisfy some minimum number of criteria, such as to find those wherein the name of the group policy object contains a particular string, where the permissions on group policy objects allow a specific group edit access, and so on. Thus, search criteria may be based on permissions for a given user or group. Other search criteria may include whether any settings in a given client-side extension are deployed through the group policy object. Similarly a search may be performed to locate scope of management objects (SOM container objects comprising sites, domains or organizational units) that have a particular group policy object linked to them. Searches for group policy objects may be based on a WMI filter that is linked to the group policy object, as well as searching based on effective or explicit permissions. A search for backups in a given file system location can also be conducted.

In accordance with an aspect of the present invention, via a search criteria interface 602, the group policy management console supports rich and efficient search capabilities based on such criteria. In general, the search functions of the group policy management interfaces 408 take a list of search criteria (if any), and based on the criteria, return a list of objects as the resultant set. For example, if more than one criterion is specified, the results 406 may comprise the set of objects that remain after taking the set intersection of the results obtained from the various individual criteria.

Each criterion comprises three primary parts, including a search property that specifies a property to which the search corresponds, a search value that needs to be matched by the specified property, and a search operation that comprises a constant indicating what sort of matching needs to be done. Supported search operations include Equals, whereby the search returns results for when the specified property matches the specified value, or NotEquals, whereby the search returns results for when the specified property does not match the specified value. Other supported search operations include Contains, which returns results when the specified property contains the specified value, and NotContains, which returns results when the specified property does not contain the specified value.

The following table sets forth some example properties and values and the operations that may be performed to evaluate a property against a value:

| Property | Operation | Value | Comments |
| --- | --- | --- | --- |
| gpoDisplayName | opEquals opContains opNotContains | Display name | Get group policy objects based on their display name |
| gpoPermissions | opContains/ opNotContains | Permission | Get group policy objects whose ACLs contain the given permission. |
| gpoEffective Permissions | opContains/ opNotContains | Permission | Get group policy objects whose effective perms contain the given permission. |
| gpoWMIFilter | opEquals/ opNotEquals | WMI Filter | Get group policy objects to which this WMI filter is linked. |
| gpoGuid | opEquals/ opNotEquals | GUID of the group policy object | Get the group policy object with the specified identifier (GUID). |
| gpoMach/User Extensions | opContains/ opNotContains | GUID of the extension | Get group policy objects that define any settings for the client side extension identified by the supplied GUID. |

In one implementation, because these operations retrieve data from the network, the group policy management console searches the Active Directory® service 202 for these objects in an efficient manner, using indexed properties maintained in the Active Directory® service 202. Results 406 may be returned to the client as they arrive (e.g., shown in FIG. 4 to the script 410, but results can also be returned to the user interface 402), so that the client can process (e.g., display) partial responses as the search is ongoing. Alternatively, results may be cached before returning, e.g., so that they may be quickly accessed if later needed. Note that efficient computations and prefetching may be performed on the local machine, such as on the search, to prevent multiple round trips to the Active Directory® service 202. For example, attempts are made when initiating the search to try to retrieve all of the relevant data in a single round trip, and not cause multiple lookups in the Active Directory® service 202. Further, even information that is not needed may be cached locally, in case that information is later needed, thus avoiding the need for additional communications with the Active Directory® service 202. Once the data is retrieved once from the Active Directory® service 202, the results are cached in the interfaces so that subsequent calls need not require additional lookups. In addition if data needs to be extracted from multiple objects (e.g. in case of GetInheritedGPOLinks) a single query is formed to get the results for all the data. Care is also taken to ensure that the query is made on indexed attributes to keep the load on the server to a minimum.

Note that group memberships are considered in an effective permissions search. For example, if an administrator wants to know which group policy objects a particular user has edit rights on, the administrator wants the information whether the edit rights are granted directly or indirectly via the user's membership in one or more security groups. Note that a user's security group information may be obtained via a call to AuthzInitializeTokenFromSid( ) on Windows® XP machines, or AuthziInitializeTokenFromSid on Windows® Server 2003. Each of these APIs returns an authz context handle which has the expanded security group membership of a user or a group as seen on the machine on which the search is being performed. Since the search needs to simulate a permission check that will be done on the domain controller, additional steps (described below) are taken to match the expanded security groups as seen on the server. For example, a user may be a member of an Administrators group on the local machine but does not have permissions on the group policy object because the user is not part of the Administrators group as seen on the domain controller. The following provides example pseudocode for these steps:

```
1.  Call AuthzInitializeContextFromSid using the specified
    trustee's Security Identifier (SID) to get an authz context
    handle.
2.  If this machine is a DC of the domain, return members
    specified in grouplist and any groups found
3.  else // we have group membership as seen from this machine
       a.  Get all groups from the context handle using
           AuthzGetInformationFromContext.
       b.  Initialize grouplist with 'authenticated users' group.
            // Since any connection to the domain controller will
            // authenticate the connection.
       c.  Foreach group defined in authz handle
           i.   If the group is not well known // well known group
                memberships are different on the DC and local machine
                1.  Add group to grouplist.
       d.  Use grouplist to get domain local group membership
           defined on the Domain Controller
           i.   Connect to Domain Controller using SamConnect and
                Connect to account domain using SamOpenDomain.
           ii.  Get group memberships by calling SamGetAliasMembership.
       e.  Use grouplist to get builtin group membership defined
           on the Domain Controller
           i.   Connect to Domain Controller using SamConnect and
                Connect to builtin domain using SamOpenDomain and
                passing it the builtin SID.
           ii.  Get group memberships by calling SamGetAliasMembership.
       f.  Handle non-native domain local group memberships by
           calling NetUserGetLocalGroups after connecting to the domain.
       g.  Create an authz context handle by adding the members
           specified in steps d. e. and f.
```

This authz context handle is built up in this manner before the search operation starts, and is reused to check permissions for each of the Group Policy Objects retrieved from Active Directory. Permissions are checked via a call to AuthzAccessCheck( ).

Turning to a consideration of various tasks involving delegating permissions (access rights) to group policy objects, like access to other objects, permissions on a group policy object are set using security descriptors in the form of access control lists (ACLs) comprising access control entries (ACEs). In general, when a user requests some level of access (e.g., read-only or write) to a resource, a user's security group membership data (security token, comprising one or more security identifies, or SIDs) is evaluated against the resource's security data in the security descriptor to determine whether the user has access rights to the object that meet the requested type of access. If so, the process grants access to that object (e.g., returns a handle) with data that controls the extent of that access, such as read only access, read/write, create and so forth.

As described above, a group policy object includes sets of data on the directory service and sysvol. Permissions on these two sets of data need to be synchronized for policies to apply correctly. The group policy management console provides an API comprising an IsACLConsistent method that takes a group policy object, looks at the permissions on the directory service and sysvol, and returns a result indicating whether the trustees have corresponding permissions on both the directory service and sysvol. Note that directory service objects and file system objects have different types of permissions, since they are different types of objects, and thus the permissions will not be identical, but they need to be consistent. For this operation, the security descriptor is read from both directory service and sysvol. Another API, MakeACLConsistent, can be called to make ACLs consistent between the Directory Service and the sysvol. Permissions across all the access control entries (ACES) are compressed into a list which has a trustee and the sets of permission that the trustee has on the directory service and sysvol. Once it is checked and established that the number of trustees are the same, for each trustee, it is checked whether the sysvol permission is consistent with the directory service permission. In addition it is checked that permissions on directory service and Sysvol are set in such a manner that they do not inherit from above.

On any given SOM, the group policy management interfaces include a GetInheritedGPOLinks method that returns the list of inherited links of GPOs (including links to that SOM) in the order that the GPOs will be applied on a client machine. This is useful for administrators to visualize the order of applying group policy objects on the client machine. This may be complex, based on whether the link is enforced or not, and whether any SOM in the given hierarchy has blocked policy from above, as generally described in U.S. Pat. No. 6,466,932. The following is example pseudocode generally describing this process:

```
Get all the links from this OU up to the root of the domain.
1.  Initialize forcedlist and unforcedlist to empty
2.  For each SOM in the order closest OU to the farthest
    a.  Initialize somforcedlist and somunforcedlist to empty
    b.  Initialize blocked to false
    c.  For each link on the SOM in the precedence order
        i.   If the link is enforced
             1.  Add to the somforcedlist
        ii.  Else
             1.  if not blocked
                    a.  Add the somunforcedlist
    d.  If som has 'block policy from above' set blocked to true
    e.  Add elements from somforcedlist to the beginning of
        forcedList
    f.  Add elements from somunforcedlist to the end of
        unforcedList
3.  Add forcedlist to the inheritedGPOLinks first followed by
    unforcedlist
4.  Return inheritedGPOLinks
```

In accordance with an aspect of the present invention, the group policy management console facilitates the management of group policy objects with respect to security descriptors. For example, delegation of permissions on group policy objects is needed to control which other administrators and users can read the contents of the group policy object, get the group policy object applied to them, edit the group policy object, edit permissions on the group policy object and/or delete the group policy object. Similarly, security descriptors on SOM objects are needed to control who can link group policy objects to the SOMs, run Resultant Set of Policy logging on the targets in the SOM, and/or run Resultant Set of Policy planning on the targets in the SOM. In addition, there are global permissions related with creating group policy objects, and creating WMI Filters.

To accomplish such tasks, the group policy management console includes interfaces, comprising an IGPMPermission interface and an IGPMSecurityInfo interface, that provide a level of abstraction over the native security descriptor. In general, the level of abstraction facilitates management of group policy delegation while isolating the detailed intricacies of the security descriptor.

The group policy management security model provides a number of features to help abstract the management tasks, including that the group policy management console combines permissions given through multiple access control entries (ACEs) in the security descriptor into single units of permissions. Further, the group policy management console only represents the permissions that are needed for the specific delegation or filtering task, and only adds the minimal permissions required to do the specific tasks. Also, the group policy management console permissions-related functionality is able to represent allowed, denied and inherited permissions, and helps differentiate between the delegation and filtering aspects of security permissions on a group policy object.

In keeping with the present invention, permissions set on different objects may be presented with a simpler logical view. For example, permissions related with creating WMI filters and/or creating group policy object can be extracted and specified in a much simpler manner at the domain level. Even though the permissions need to be set physically on different objects, the present invention presents a much simpler model for delegation to the user, in that the group policy management console hides the implementation details by combining permissions on multiple objects into a simpler logical presentation.

Internally these permissions are mapped to actual low level permissions on the actual directory service, and (if necessary) on the sysvol parts of the group policy object. When the permissions are set using the group policy management interfaces, an attempt is made to combine the data with the existing access control entries (ACEs) on the object to increase efficiency. As described above, the group policy management interfaces provide methods (e.g., IsACLConsistent and MakeACLConsistent) to synchronize permissions between the directory service and the sysvol parts of the group policy object.

Permissions that can be set on a group policy object using group policy management interfaces comprise apply (permGPOApply), read (permGPORead), edit (permGPOEdit) and a permission to edit, modify security on, and delete a group policy object (permGPOEditSecurityAndDelete). On SOMs the relevant permissions comprise permSOMLink, permSOMLogging and permSOMPlanning. In addition, other permissions that may be specified only on domain SOMs comprise permSOMGPOCreate, permSOMWMI-FullControl and permSOMWMICreate. As also described below, on WMI filters the relevant permissions comprise permWMIFilterEdit and permWMIFilterFullControl. In addition group policy management console is able to display and remove custom permissions set by the user on the group policy object and WMI filters. A custom permission refers to one that does not match one of the pre-defined permission levels previously described.

In accordance with an aspect of the present invention, the group policy management console 212 allows administrators to conduct searches for group policy objects using different types of permission criteria. One type of permission criteria is based on explicit permissions set on the group policy objects. An explicit permissions-based search evaluates whether a given user has been given these explicit permissions on the group policy object. The group policy management console 212 accomplishes the evaluation by downloading the actual security descriptor, and using it in a check.

Another type of permission criteria is based on effective permissions set on the group policy objects. An effective permissions-based search evaluates whether a given security principal (computer, user or group) has the permissions either explicitly or because of memberships in security groups. The group policy management APIs 408 accomplish the evaluation by recursively expanding the security group membership of the user or group, and then comparing the resultant list of security groups against the downloaded security descriptor.

The underlying permissions of security descriptors are generally very complex, and to delegate them properly, the administrator needs to be specifically aware of the permissions that are required for each task. The present invention abstracts the security settings via the group policy management interfaces 408, thereby eliminating the need for administrators to deal with the details on how security settings are managed. In addition, the present invention provides detailed status messages and progress notifications, as described below.

To abstract the security settings, the group policy management interfaces 408 conceptually build an abstraction atop of the security descriptors that facilitates the delegation of standard administrative tasks. Such tasks performed on a group policy object include delegating (e.g., to another user) read permission to read a group policy object, or to edit a group policy object, that is, the ability to add new (or remove or change existing) settings into the group policy object (but not the ability to delete the group policy object or edit the permissions on the group policy object). Another delegation task includes delegating edit rights, plus the ability to change permissions and delete a group policy object. For the purposes of filtering a group policy object, an administrator can give permissions such that the group policy object gets applied to a user, group, or computer. For a group policy object to apply to a user, the group policy object needs to be linked somewhere in the users' organizational unit hierarchy, (e.g., in the organizational unit or a higher parent thereof such as a domain or other organizational unit), and the user needs to have read and apply group policy permissions on the group policy object. Yet another task comprises delegating creation rights to create a group policy object, and/or WMI filter creation rights, which are specific to a domain.

Similarly on a SOM, delegation tasks that are group policy related include delegating permissions to manage group policy object links on a SOM, delegating permission to collect a group policy results (Resultant set of policy—logging mode) data for users and/or computers in a SOM, and delegating permission to collect group policy modeling (resultant set of policy—planning mode) data for users/computers in a SOM. On domains, administrators also have the ability to delegate permissions to create group policy objects or WMI filters.

For each task described above, a higher-level abstract group policy management permission has been created. These abstract group policy management permissions translate to actual directory service permissions and file system permissions (for group policy objects) when they are added and removed from a group policy object, SOM or WMI filter in the manner listed in the tables below (in which permissions shown in bold are group policy management abstractions, and directory service permissions and file system permissions (where relevant) not bold):

---

GPO Permissions gpoRead : Directory service permissions:
    ADS_RIGHT_READ_CONTROL+
    ADS_RIGHT_ACTRL_DS_LIST+
    ADS_RIGHT_DS_READ_PROP
    File system permissions:
    (SYNCHRONIZE | READ_CONTROL|
    FILE_LIST_DIRECTORY |
    FILE_READ_ATTRIBUTES | FILE_READ_EA |
    FILE_READ_DATA | FILE_EXECUTE)

-continued gpoEdit: gpoRead+
    Directory service permissions:
    ADS_RIGHT_DS_WRITE_PROP+
    ADS_RIGHT_DS_CREATE_CHILD+
    ADS_RIGHT_DS_DELETE_CHILD
    File system permissions:
    FILE_WRITE_DATA |
    FILE_APPEND_DATA | FILE_WRITE_EA |
    FILE_WRITE_ATTRIBUTES | FILE_ADD_FILE |
    FILE_ADD_SUBDIRECTORY |
    FILE_DELETE_CHILD
gpoEditSecurityAndDelete:
    gpoEdit+
    Directory service permissions:
    ADS_RIGHT_WRITE_DAC+
    ADS_RIGHT_WRITE_OWNER+
    ADS_RIGHT_DELETE
    File system permissions:
    DELETE |WRITE_DAC
    WRITE_OWNER
gpoApply: gpoRead+
    ADS_RIGHT_DS_CONTROL_ACCESS for 'Apply Group
    Policy' Extended right
gpoCustom:
    Custom permissions are returned when a set of
permissions for a given user or group(trustee) does not fit
into one of the patterns specified here or if the
permissions are not all allowed or denied.

SOM Permissions somLink:
    ADS_RIGHT_DS_READ_PROP of gpLink property+
    ADS_RIGHT_DS_READ_PROP of gpOptions property+
    ADS_RIGHT_DS_WRITE_PROP of gpLink property+
    ADS_RIGHT_DS_WRITE_PROP of gpOptions property
somLogging
    ADS_RIGHT_DS_CONTROL_ACCESS of 'Generate Resultant
    Set of Policy(Logging)' extended right
somPlanning
    ADS_RIGHT_DS_CONTROL_ACCESS of
    'Generate Resultant Set of Policy(Planning)' extended
    right
Note:
    somLogging and somPlanning permissions are not for
sites because these permissions are only available on OUs
and Domains

Additional Domain Specific permissions somWMICreate
    ADS_RIGHT_ACTRL_DS_LIST+
    ADS_RIGHT_DS_READ_PROP+
    ADS_RIGHT_READ_CONTROL+
    ADS_RIGHT_DS_WRITE_PROP+
    ADS_RIGHT_DS_CREATE_CHILD
somAllWMIFllterFullControl
    somWMICreate+
    ADS_RIGHT_DS_DELETE_CHILD+
    GENERIC_ALL | DS_GENERIC_ALL inherited permission
    on children
The two WMI related permissions listed above are set and
queried from cn=som,cn=wmipolicy,cn=system subcontainer of
the domain
somGPOCreate
    ADS_RIGHT_DS_CREATE_CHILD
This directory service permission is set and queried from
cn=policies,cn=system subcontainer of the domain
    FILE_ADD_SUBDIRECTORY | FILE_ADD_FILE
This file system permission is set in the sysvol on the
Policies folder in the domain. The Policies folder is
located at the following path
\\domain\sysvol\%domain%\policies (wherein %domain% is the
DNS name of the domain).
    While other permissions are abstracted on the container
on which they are set, these permissions are abstracted at
the domain level, even though the actual permissions are set
on child containers. This is because they are domain level
properties that control who has permissions on all wmi
filters, who can create wmi filters and who can create group
policy objects in a given domain.

-continued

WMI Filter Permissions

WmiFilterEdit
    ADS_RIGHT_READ_CONTROL+
    ADS_RIGHT_ACTRL_DS_LIST+
    ADS_RIGHT_DS_READ_PROP+
    ADS_RIGHT_DS_WRITE_PROP
WmiFilterFullControl
    WmiFilterEdit+
    ADS_RIGHT_WRITE_DAC+
    ADS_RIGHT_DS_DELETE_TREE+
    ADS_RIGHT_DELETE
wmiCustom:
    Custom permissions are returned when set of permissions
    for a given user or group(trustee) does not fit into one of
    the patterns specified here or if the permissions are not
    all allowed or denied.
    WMI filter objects are individual objects and they reside
    under the cn=som,cn=wmipolicy,cn=system container with their
    cn being the same as the wmi filter ID.

The group policy management interfaces 408 present the permissions for a trustee based on a number of rules. The permissions are contained in access control entries, or ACEs. Multiple ACEs can be present for a given trustee. The group policy management interfaces present a given abstract permission if (and only if) all the bits required by abstract permission are present in the security descriptor (in a single ace or across multiple aces) for the trustee, and all the permission bits are either all allowed or denied. If any of the bits are inherited, the group policy management interfaces show the permission as inherited, and if all of the permission bits are inheritable, the group policy management interfaces show the permissions as inheritable.

The group policy management APIs 408 include a GPM-SecurityInfo interface 628 (FIG. 6) that returns permissions as a collection of GPMPermission interfaces. The GPMPermission interface contains properties that represent the trustee, the abstracted group policy management console permission level, a Boolean indicating whether the permission is allowed or denied, a Boolean indicating whether the permission is inherited, and a Boolean indicating whether the permission is inheritable.

Figure 4:
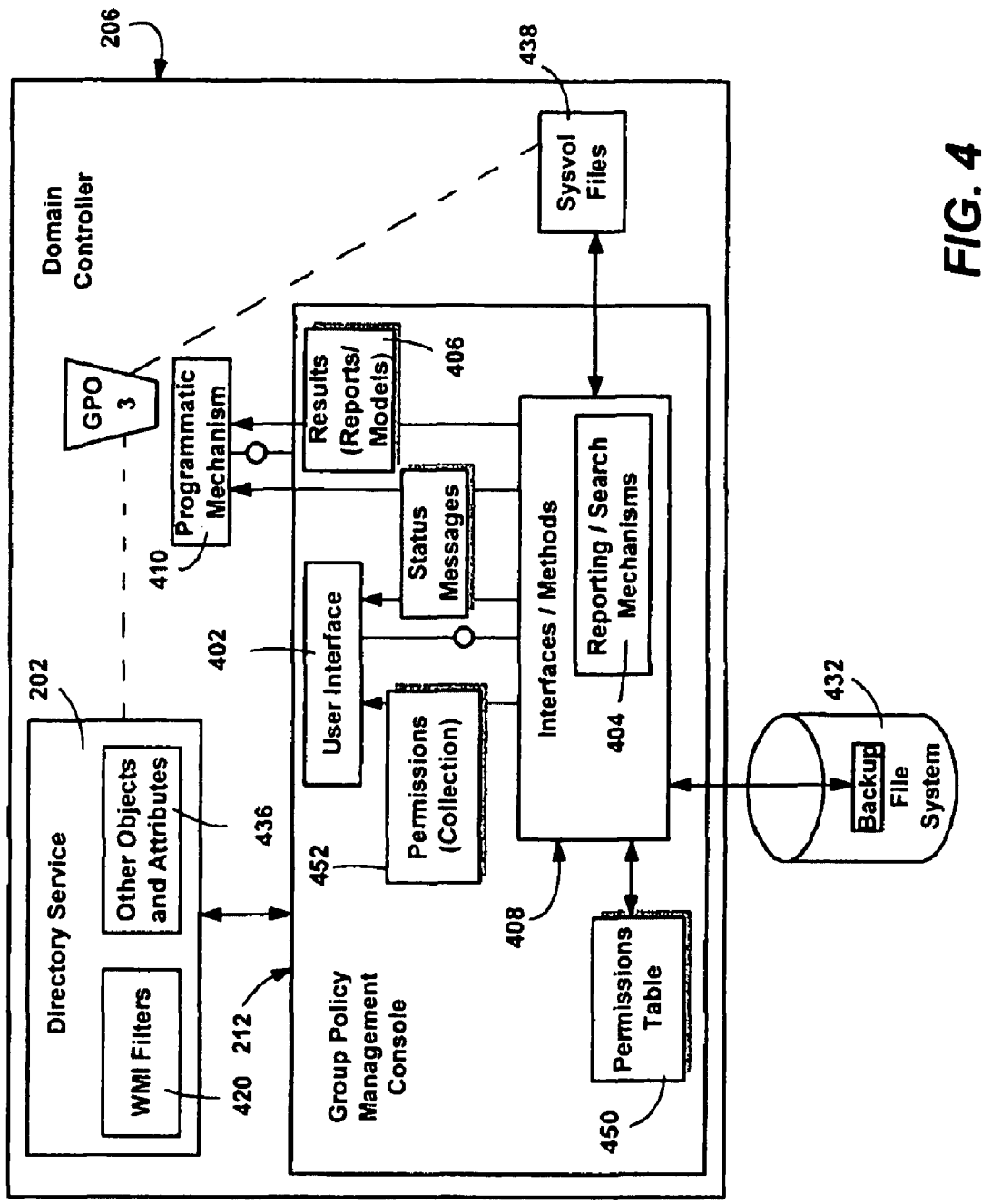
FIG. 4 is a block diagram generally representing a group policy management console including interfaces that facilitate various management tasks in accordance with an aspect of the present invention.

To create the abstractions, a security descriptor is loaded and mapped to an abstraction. Loading a Security Descriptor includes evaluating the permissions (ACEs) for a trustee. To load, the group policy management console queries the directory service 202 and receives the security descriptor or descriptors associated with the specified object or objects. The group policy management console then attempts to create a permissions table 450 (FIG. 4), which is used as a basis for returning permissions information to the user, and for manipulating the security descriptor. Note that the security descriptor may be saved to an object in case of changes, and permissions may be added and removed. Further, note that FIG. 4 shows a collection of permissions data 452 (a collection of IGPMPermissions constructed from the row entries in the permissions table) being returned to the user interface 402 as the client, however it is understood that the permissions table 450 may instead be returned, and that either can also be returned to an external executable program 410 such as a script client 410.

In the permissions table 450, each row corresponds to a trustee, and each column in the permission table corresponds to a directory service permission. The cells contain data regarding the access state (Allowed, Denied, not configured), and indicate whether inherited, whether inheritable, and whether in a dirty state (to handle modifications).

The following code representation comprises pseudocode that represents the creation of the permissions table:

```
For eachsecurityDescriptor sd
    For eachACE in sd.Dacl
        For eachPERMISSION_BIT perm in table.Columns
            if ace.ContainsPermission(perm)
                if table[ace.Trustee, perm].AccessState == NotSet
                    // Take first defn of a perm
                    table[ace.Trustee, perm].AccessState =
                        ace.AccessState
                    table[ace.Trustee.perm].Inherited = ace.Inherited
                    table[ace.Trustee.perm].Inheritable = ace.Inheritable
                else
                    if table[ace.Trustee, perm].AccessState ==
                        ace.AccessState
                    // Add inheritance attributes
                        table[ace.Trustee.perm].Inherited |= ace.Inherited
                        table[ace.Trustee.perm].Inheritable |=
                            ace.Inheritable
```

Figure 7:
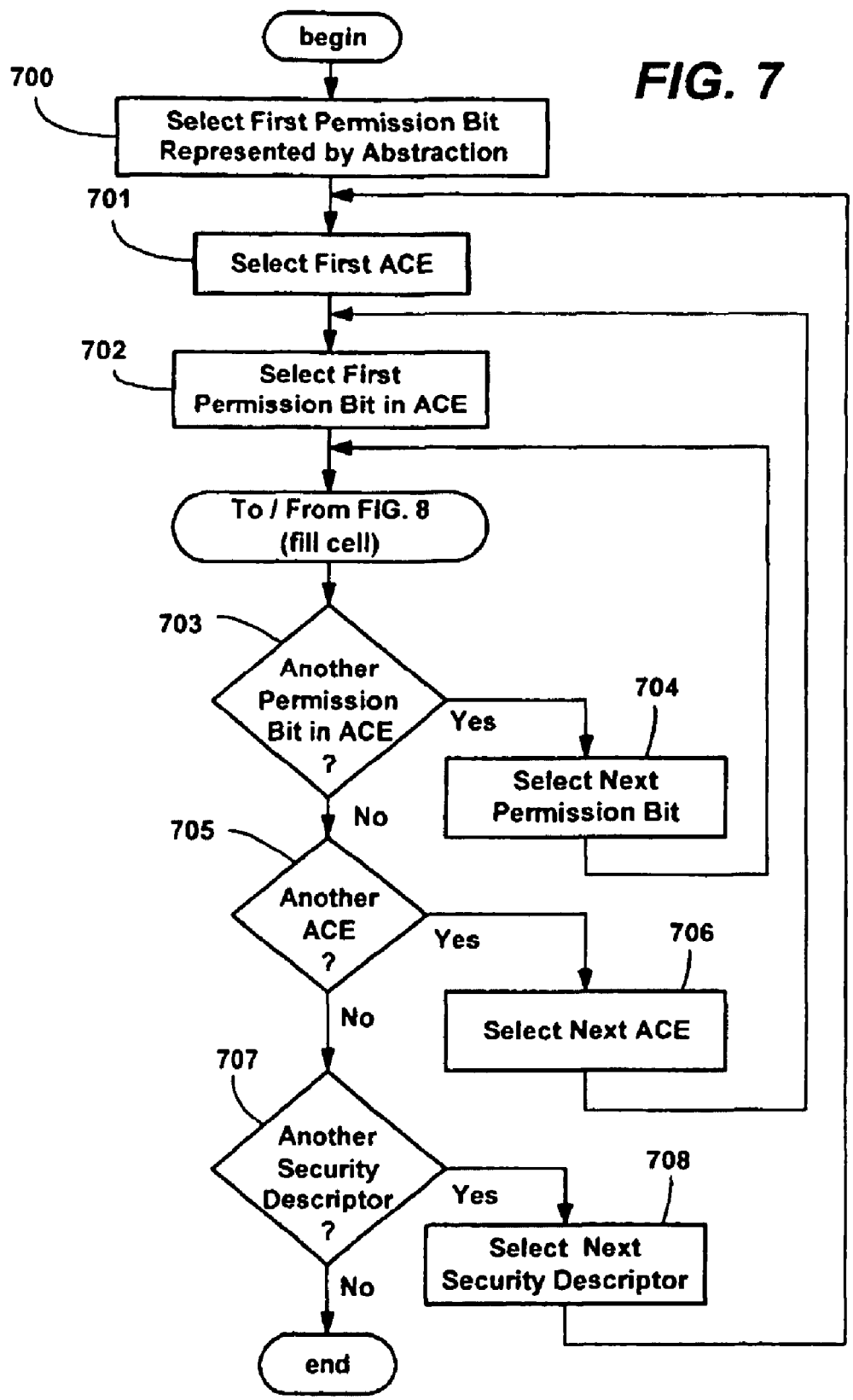
FIGS. 7 and 8 comprise a flow diagram generally representing a process for filling cells of a permissions table in response to a permissions-related call, in accordance with an aspect of the present invention.
Figure 8:
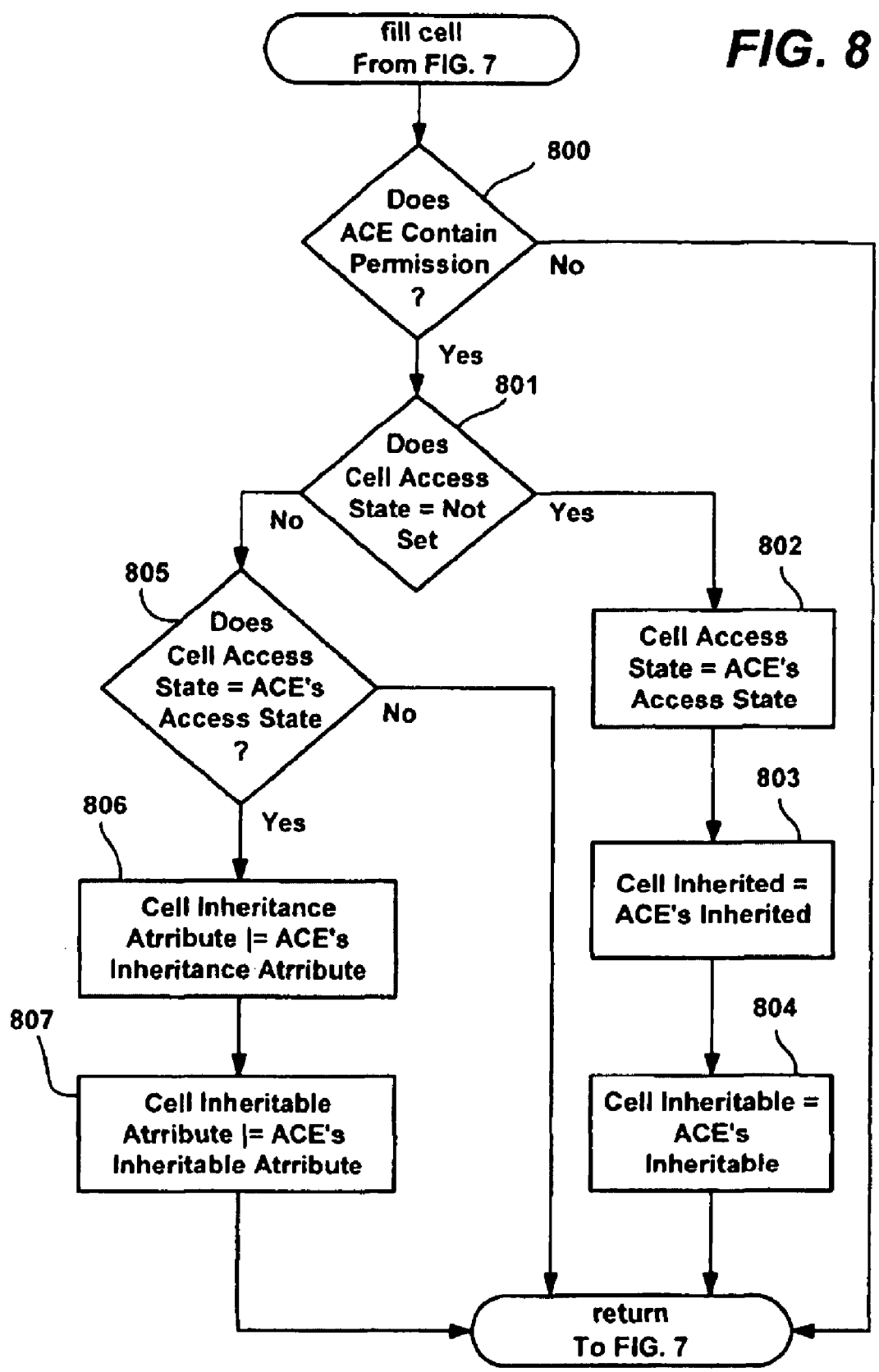

The logic is also represented in FIGS. 7 and 8 via steps 701-707, which represent walking through each security descriptor, each ACE in the security descriptor, and each permission bit in the ACE (the cell being filled appropriately adjusts as shown in the pseudocode), and via steps 801-807 which represent the logic for filling the table cell. Note that as represented in FIG. 8 and the pseudocode, the order of processing the ACEs determine how the cell is filled. Once the effective table is populated, the table 450 may be used to return the list of permissions 452 (e.g., as GPMPermission interfaces which represent the entries in the table or a modification thereof) from the group policy management interfaces 408.

Each row of the table is used to create the list of GPMPermissions to be returned to the user, which differ slightly based on the kind of objects for which the security descriptor abstraction is being created.

A check (for a well-formed permission) may be performed to establish that all of the permission bits for a given permission are either allowed or denied. The check also indicates that the permission bits present completely match one of the predefined levels and there are no additional permission bits from one of the supersets.

Figure 9:
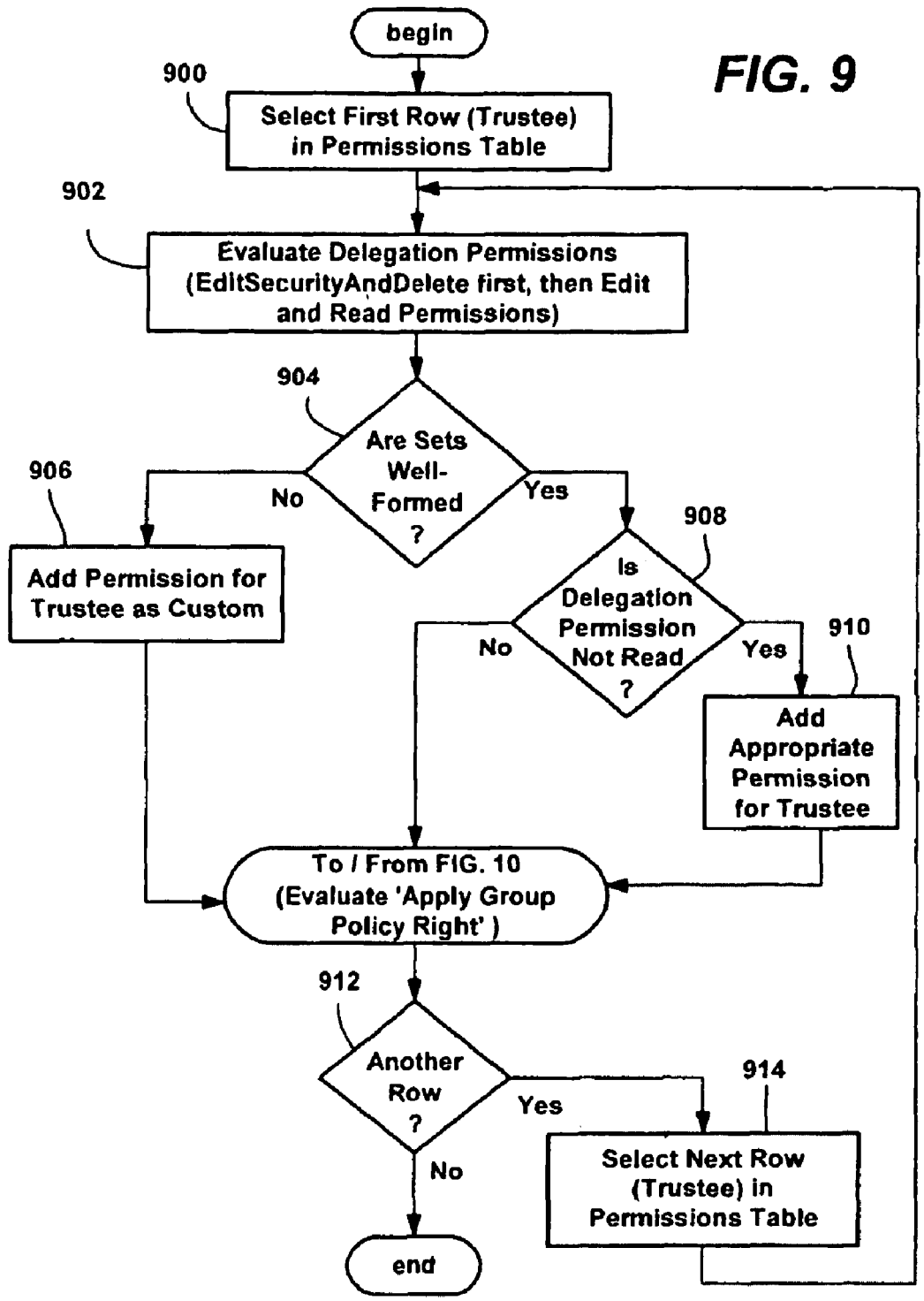
FIGS. 9 and 10 comprise a flow diagram generally representing a process for checking group policy object delegation permissions and apply rights, in accordance with an aspect of the present invention.

More particularly, a group policy object includes two classes of permissions, namely permissions related to delegation, such as read, edit and EditSecurityAndDelete, and apply permissions. As represented via steps 900, 912 and 914 in FIG. 9, for each row (trustee) in the permissions table 450, the delegation permissions are evaluated, with EditSecurityAndDelete evaluated first, followed by edit and read permissions (step 902). If the sets of permission bits are not well formed (step 904), the permission for the trustee is added as custom, otherwise if the delegation permission is not set to read (step 908), the appropriate permission for the trustee is added at step 910.

Figure 10:
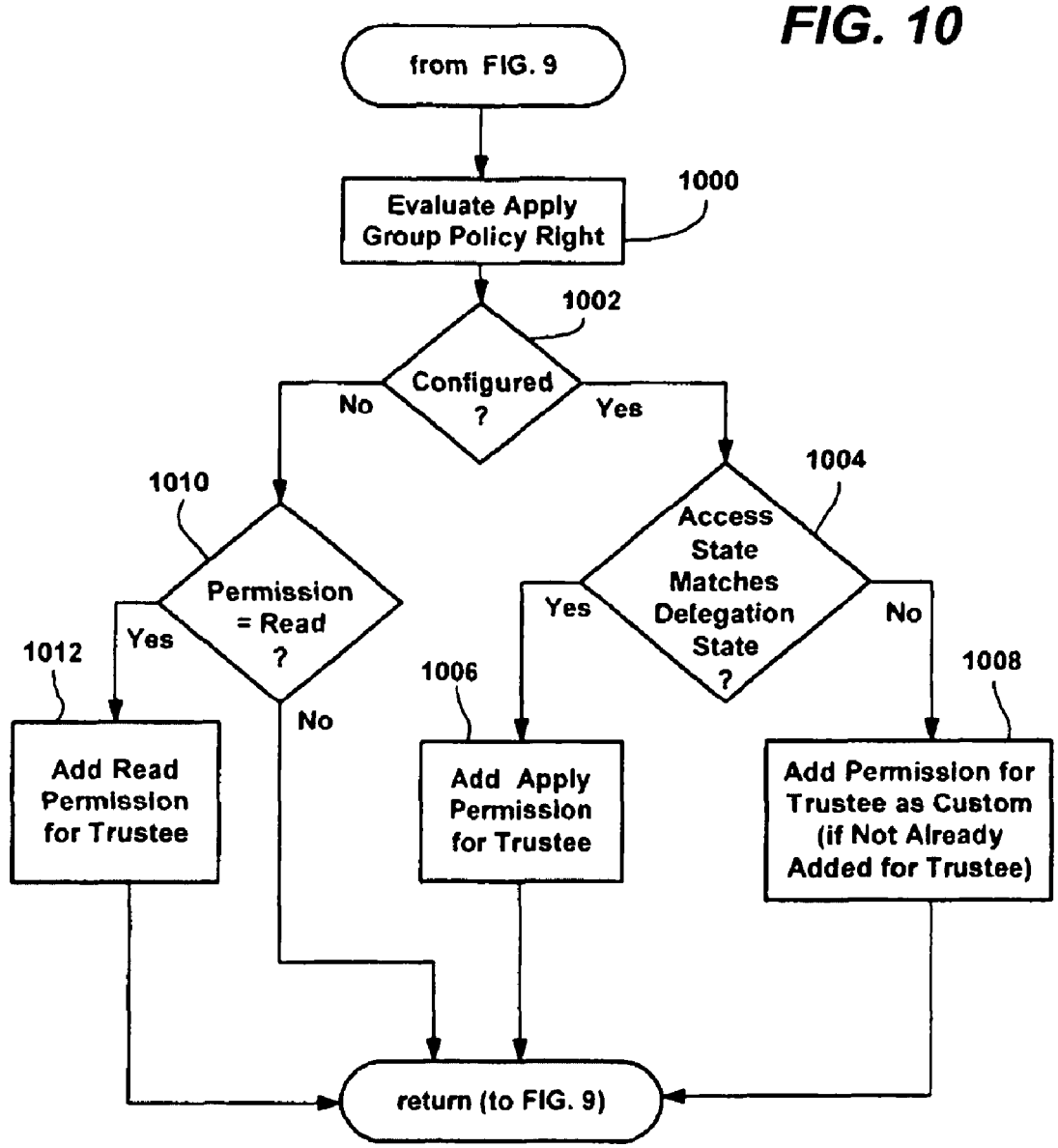

The process then continues to FIG. 10, to evaluate the 'Apply group policy Right' at step 1000. If at step 1002 the apply group policy right is configured, then step 1002 branches to step 1004, where the process determines whether the apply group policy right access state (allowed or denied) matches the delegation state (allowed or denied). If so, the apply permission is added for the trustee at step 1006, otherwise the permission for the trustee is added as custom at step 1008 (if it is not already added for the trustee).

Returning to step 1002, if the apply group policy right is not configured, the process instead branches to step 1010 to determine whether the delegation permission was set to read. If so, step 1012 adds read permission for the trustee.

Figure 11:
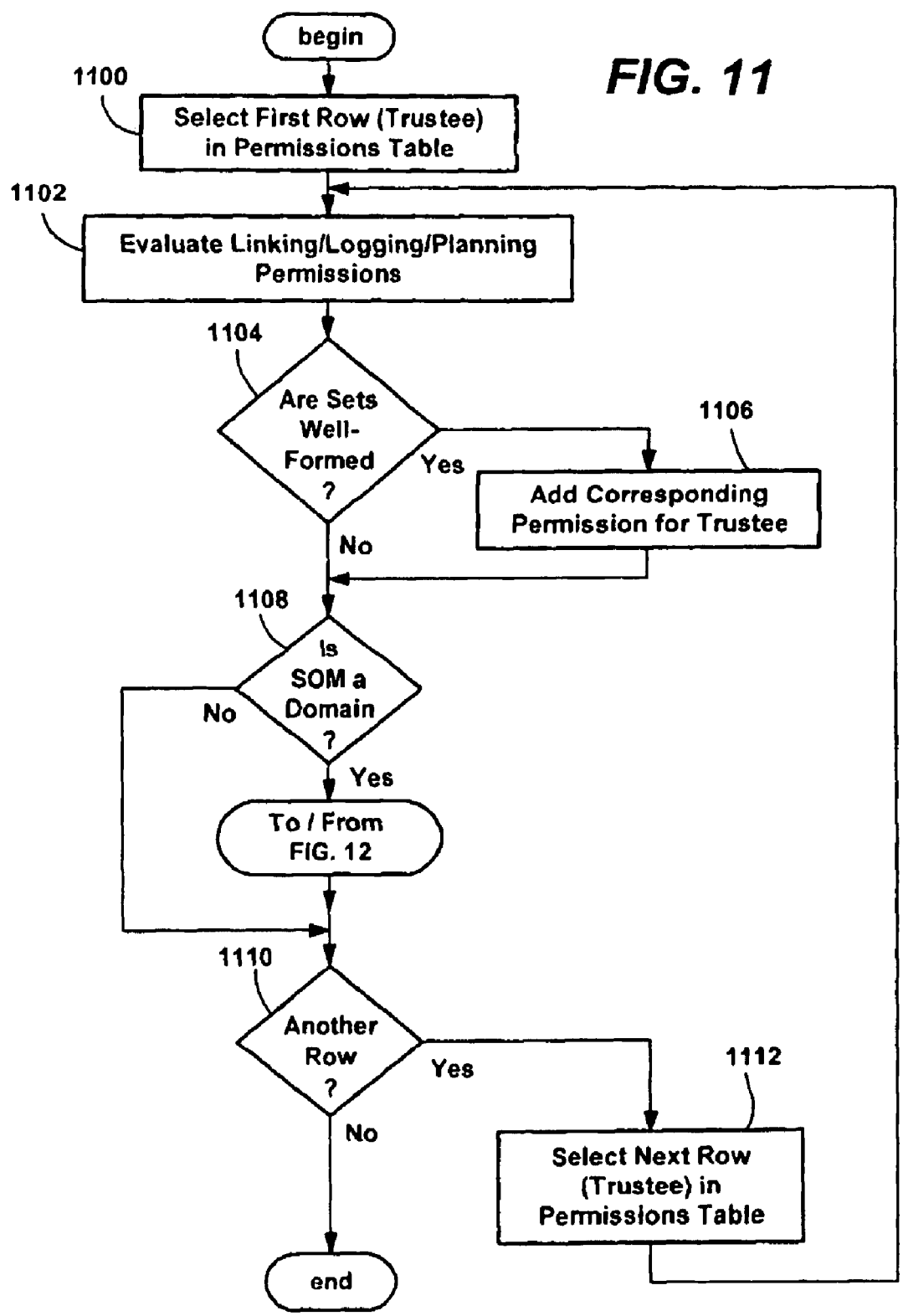
FIGS. 11 and 12 comprise a flow diagram generally representing a process for checking scope of management-related permissions, in accordance with an aspect of the present invention.
Figure 12:
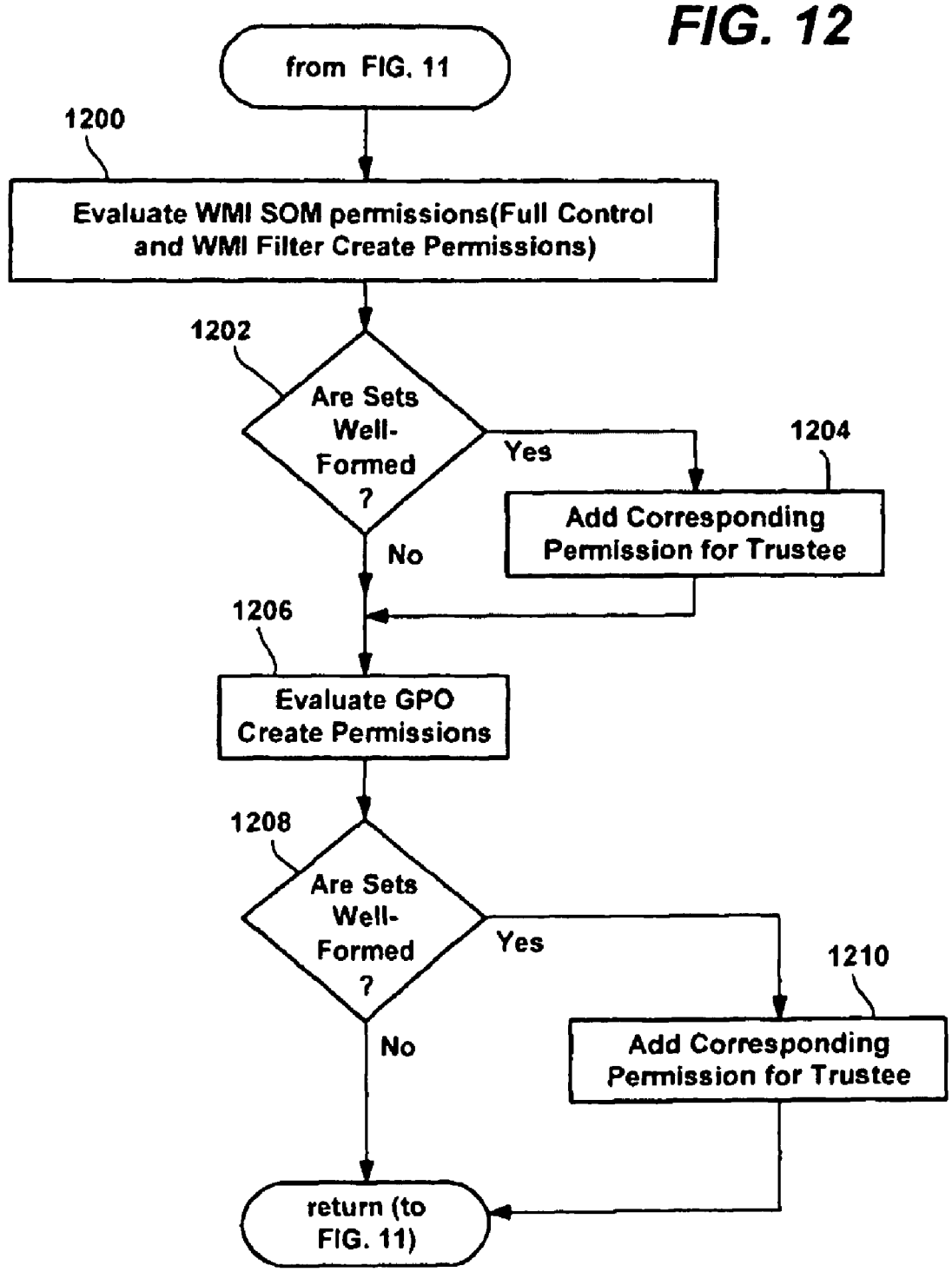

FIGS. 11 and 12 represent the checking process for SOMs, with steps 1100, 1110 and 1112 repeating the process for each row (trustee) in the permissions table. Step 1102 represents evaluating the linking/logging/planning permissions, with step 1104 determining whether the sets of permission are well formed. If so, step 1106 adds the corresponding permission for the trustee.

If the SOM is a domain at step 1108, the process continues to step 1200 of FIG. 12, which evaluates the WMI SOM permissions (Full Control and WMI Filter Create Permissions). If the sets of permission are well formed (step 1202), step 1204 adds the corresponding permission for the trustee, otherwise it is not added. Step 1206 then evaluates group policy object creation permissions, and if the sets of permission are well formed (step 1208), the corresponding create permission is added for the trustee.

Figure 13:
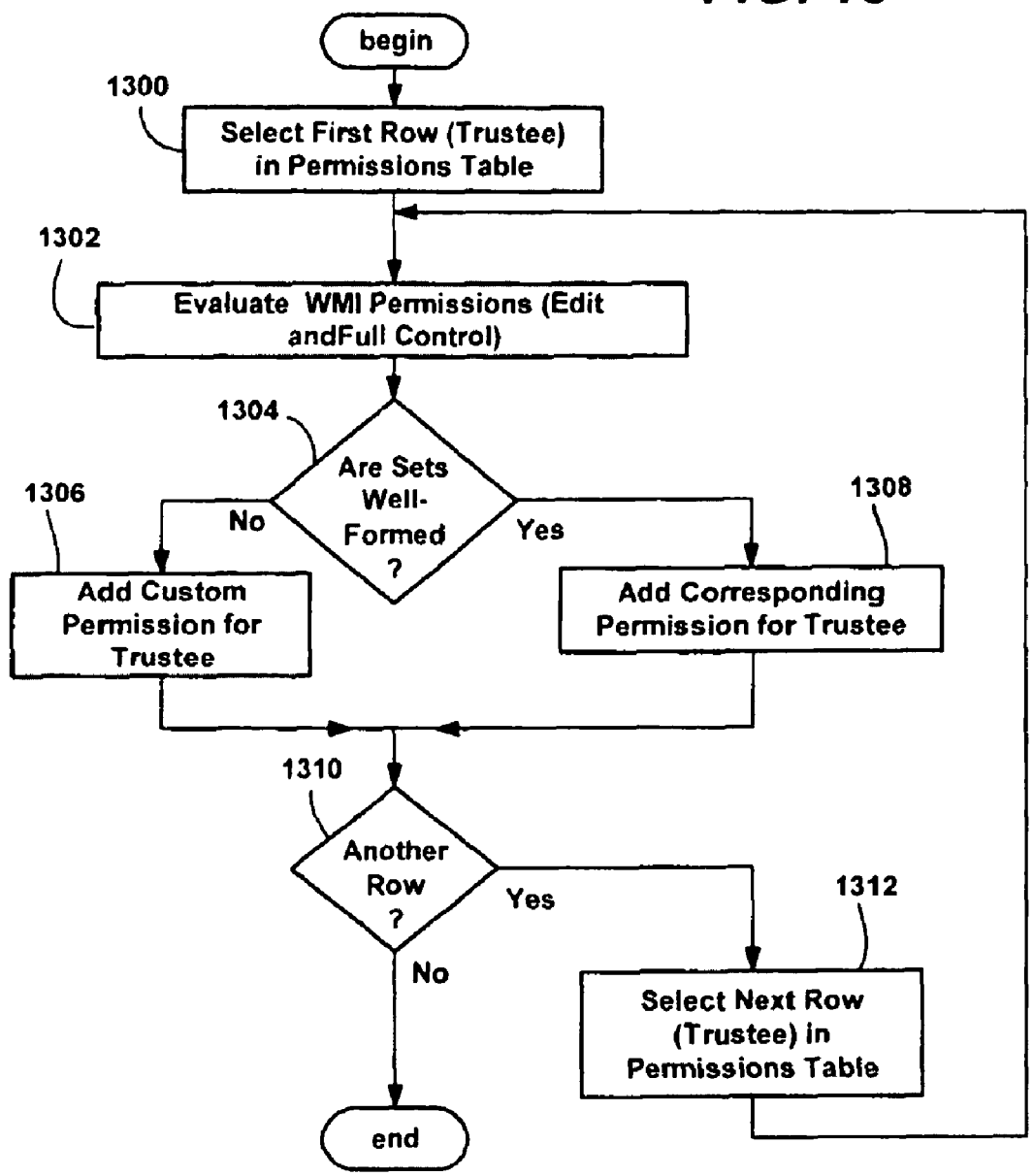
FIG. 13 is a flow diagram generally representing a process for checking management instrumentation-related permissions in accordance with an aspect of the present invention.

FIG. 13 represents the checking process for WMI filters, with steps 1300, 1310 and 1312 repeating the process for each row (trustee) in the permissions table. Step 1302 represents evaluating the WMI permissions (Edit and Full Control), with step 1304 determining whether the sets of permission are well formed. If so, step 1308 adds the corresponding permission for the trustee, otherwise step 1306 adds a custom permission for the trustee.

Allowed predefined permissions can be set on objects by calling IGPMSecurityInfo::Add or Remove methods. These operations update the permissions table, and an IGPMPermission is regenerated for the trustee for whom permissions were replaced/added. The permission table is also marked as changed (dirty) in the appropriate cells.

Permissions can be retrieved by calling GetSecurityInfo on the object, such as to make changes to them. Updated permissions need to be saved back into the object, which is accomplished by calling SetSecurityInfo on the object for which the permissions are to be set. The save method needs to account for various situations, including that because multiple security descriptors on different objects are abstracted out into one single collection, a user might not have permissions to update all the security descriptors. Thus, care needs to be taken to update only the security descriptors that have changed by manipulation via the interfaces. Further, if the permission is already set, additional ACEs should not be added to the security descriptor, since it will cause unnecessary increase in the data structure in the directory service.

Figure 14:
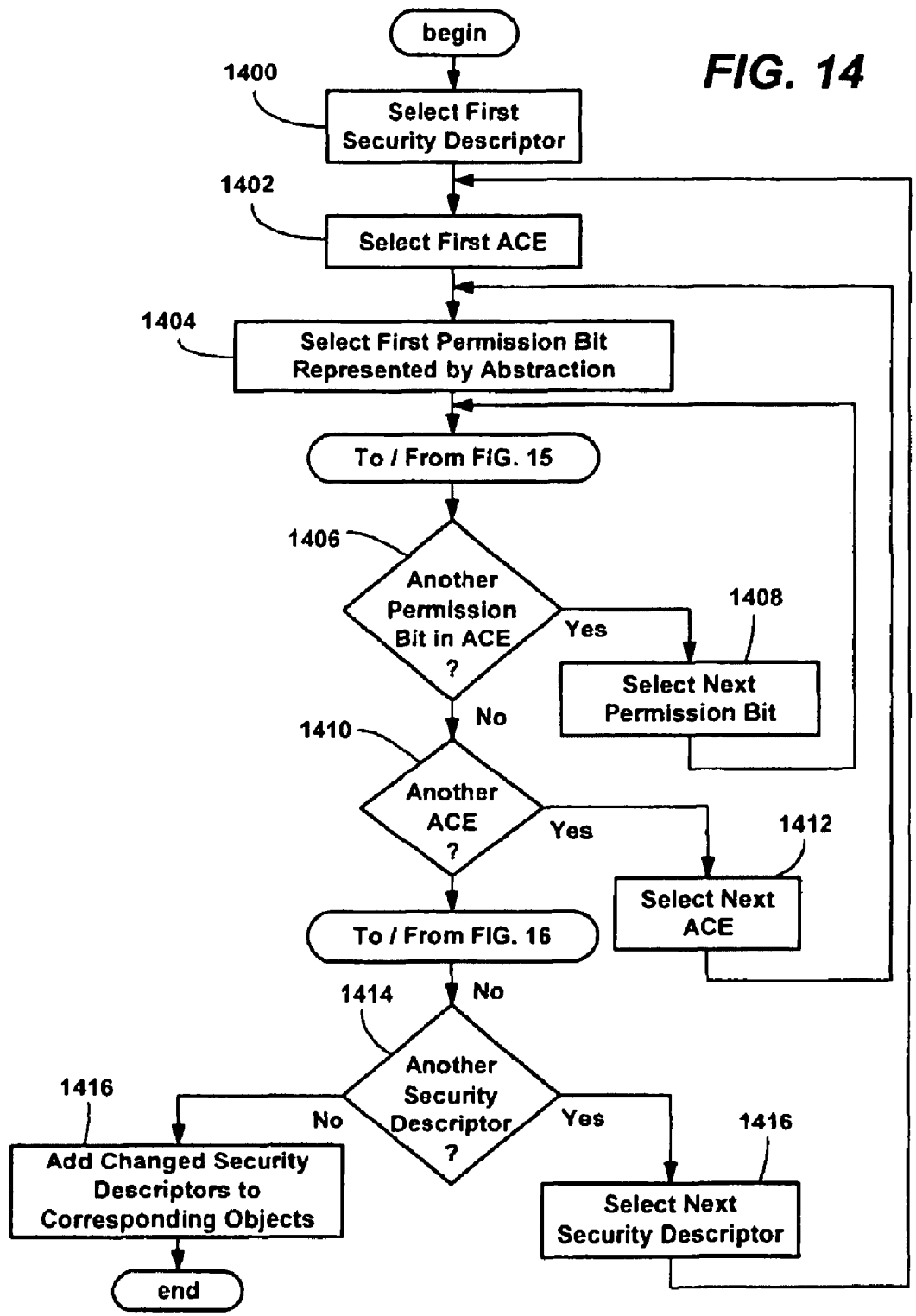
FIGS. 14-16 comprise a flow diagram generally representing a process for saving changed permissions, in accordance with an aspect of the present invention.
Figure 15:
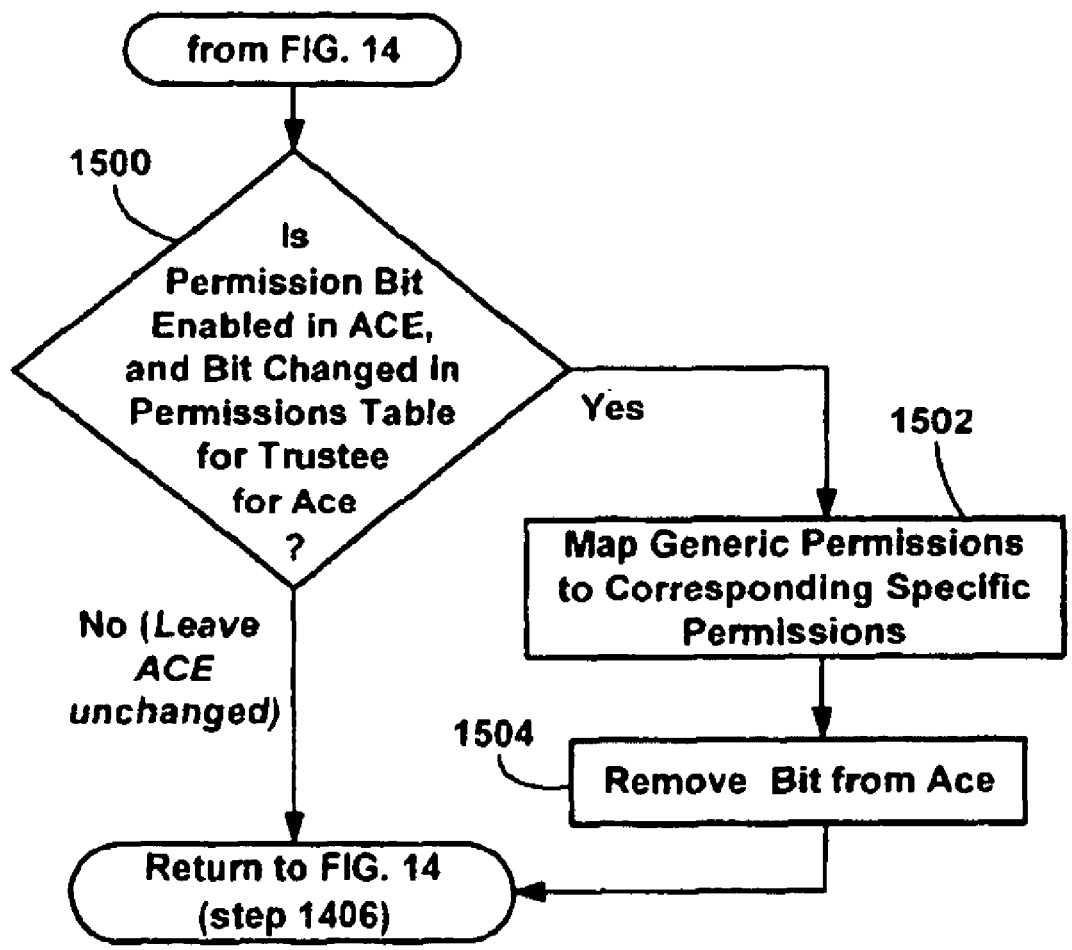
Figure 16:
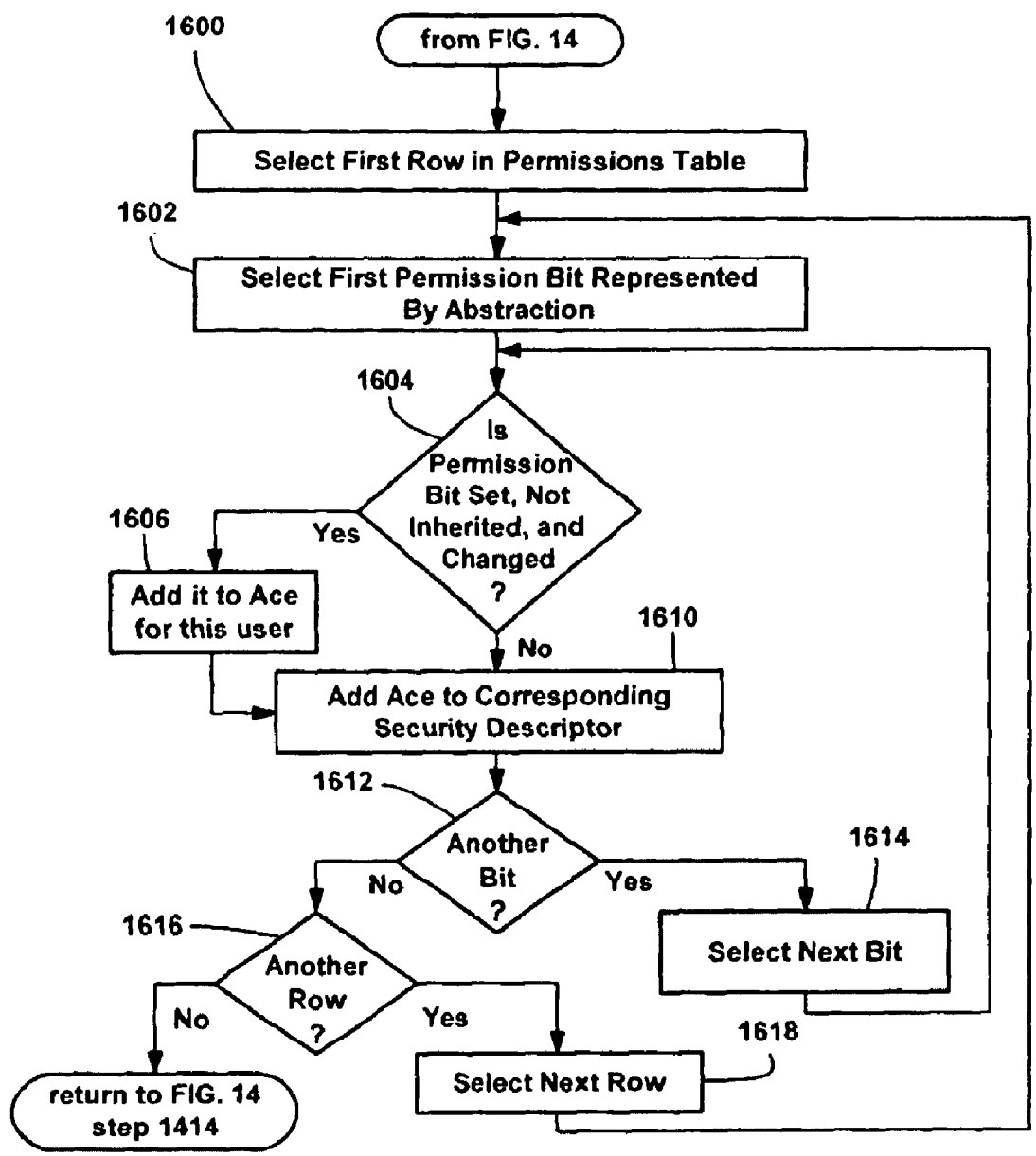

FIGS. 14 and 15 represent the process when the save method API is called, wherein steps 1400, 1414 and 1416 repeat for each Security Descriptor specified for the abstraction, steps 1402, 1410 and 1412 repeat for each ACE in the Security Descriptor, and steps 1404, 1406 and 1408 repeat for each Permission bit represented by the abstraction.

Step 1500 tests whether the permission bit is enabled in the ACE and if the bit has changed in the permissions table for the Trustee for the ACE. If so, at step 1504 the bit is removed from the ACE, after ensuring at step 1502 to map the generic permissions to corresponding specific permissions before removing. Otherwise the ACE is left unchanged. The process returns to FIG. 14 step 1406 to repeat for permission bits, and then to step 1410 to repeat for ACEs.

For each row in the effective table (via steps 1600, 1616 and 1618) and for each permission bit (column) in each row in the effective table (via steps 1602, 1612 and 1614), if the permission bit (column) is set, if it is not inherited and if it has changed (step 1604), the permission bit's data is added to the ACE for this trustee via step 1606. This ACE is added to the corresponding Security Descriptor at step 1610.

Returning to FIG. 14, when the process has been performed on the security descriptors, step 1414 branches to step 1416, where the changed Security Descriptors are applied to the corresponding objects.

In general, the directory service allows two different kinds of permissions to be set, including permissions that are fairly generalized, such as read all properties, and permissions that are much more specific, such as to read a particular property. The second set of ACEs are larger, because the set needs to contain the GUID of the property on which read permission is granted. This introduces problem for group policy management console, namely that if a trustee has read all properties and write all properties on a SOM, then group policy management console will return a IGPMPermission saying that this trustee has ability to link group policy objects, because to link group policy objects only read and write on the gpLink and the gpoptions properties are needed. Then, if caller wants to remove this permission, the group policy management console needs to figure out the other properties defined on the SOM. This trustee thus would be given read and write on all properties except for gpLink and gpOptions.

As a result a single ACE would be exploded into a large number of Object ACEs. This splitting of regular ACEs into object ACEs would increase the size of security descriptor by a large amount, and is thus disallowed by group policy management interfaces, e.g., whenever permissions are set using general permissions, the interfaces return an error (ERROR_NOT_SUPPORTED) when the caller attempts to remove the permissions that have been actually set through the more generic mechanism.

Turning to an explanation of other interfaces provided by the group policy management console, some of the operations in group policy management console, such as backup, restore, copy and import are operations that perform a wide variety of tasks. The various operations can manipulate files and directories on local and/or remote file systems and in the Active Directory® service. Since these operations are dependent on network responsiveness, and are often time-consuming, the caller needs indications of progress. It is also necessary for these operations to be cancelable during the operation.

These tasks thus need to be dynamic and interactive, for example to convey various data to the administrator, such as progress, and data to indicate why certain choices were made during the operation. Such messages are dynamic in nature depending on the operation and inputs into the operation.

Figure 17:
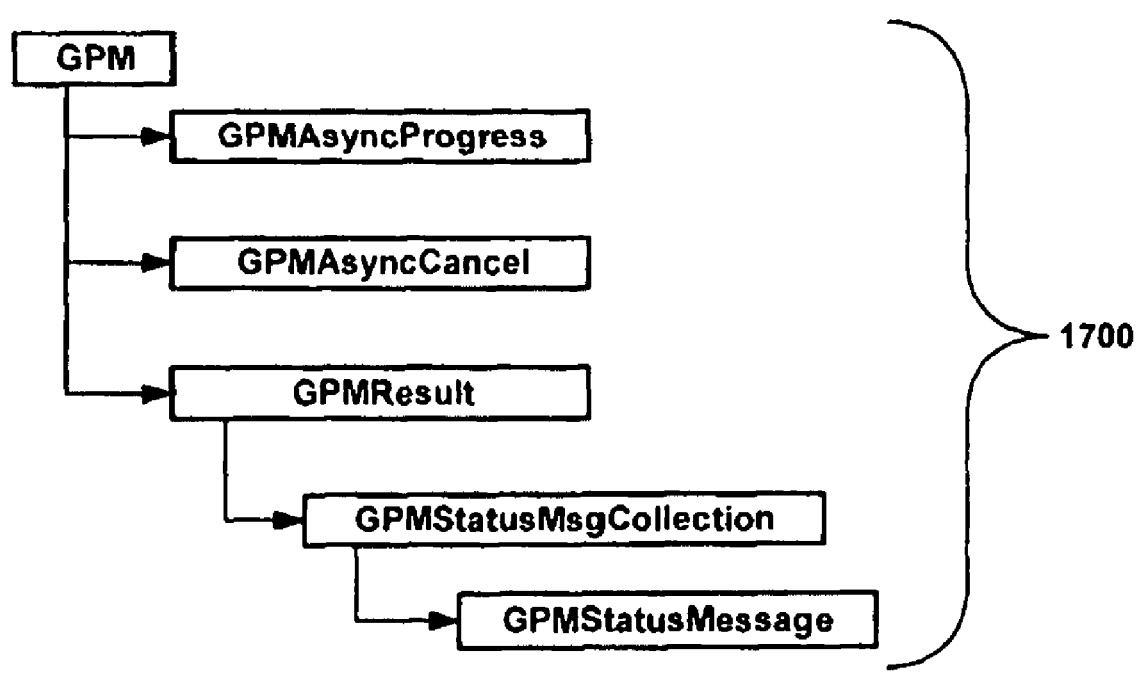
FIG. 17 is a representation of additional interfaces of the group policy management console for dynamically providing information from and interaction with the group policy management console, in accordance with an aspect of the present invention.

As represented in FIG. 17, the group policy management console provides a number of methods 1700 for such interactive and dynamic functions, including a status-related method that when called returns a collection comprising a rich set of status messages (e.g., more than simply a message and/or error code) to the caller.

The status messages comprise a rich description of the choices made and the conditions that were found in the network computing environment while performing the operation. This information may include a description of any issue encountered, and details about the operation that was being attempted or performed. Status messages also indicate the object (e.g., within the group policy object) that was being manipulated.

In general, status messages may be informational-type messages, such as to indicate actions taken during the operation, warning-type messages that indicate potential issues that were detected during the operation, or error-type messages. When a warning situation is encountered during the operation, the operation continues with indications to the user about possible issues. When an error situation occurs, the operation is prevented from continuing, and error messages indicate the conditions that were detected that caused the halt. These messages are accessible to scripts and higher level programming languages.

The group policy management console allows the caller to call these methods synchronously or asynchronously for these operations, such as during a backup operation. If the method is called asynchronously, certain additional features are enabled on these methods, as described below. It should be noted, however, that in one implementation, scripts can only call these methods synchronously.

For example, before any operation is started, a computation is made on the number of steps required to finish the operation. Periodically these methods call back into the caller to indicate progress being made against the specified number of steps. This can be used, for instance, to update a progress dialog or any other kinds of visual indications to the caller.

While an operation is being performed, the administrator has the ability to cancel the operation. Operations are performed in such a manner that the user can cancel them. These methods will return the objects to the state that the objects were in before the partially-completed (now-canceled) operation was initiated.

As can be appreciated, because the interfaces support scripts, various functionality can be invoked programmatically. For example, a set of CreateEnvironment scripts (e.g., named CreateEnvironmentFromXML.wsf and the CreateXMLFromEnvironment.wsf) takes the entire set of group policy related data for a domain and helps replicate that data to a new domain. This functionality is useful in creating a test environment that is a replica of another domain. The CreateEnvironment scripts use the group policy management console scripting interfaces (and active directory interfaces) to copy data across to another domain.

In general, the CreateEnvironment comprises a set of scripts including one script that generates an XML file and a set of group policy object backups based on a domain configuration. This script processes the specified domain to backup the group policy objects, organizational units, links on SOMs to group policy objects, WMI filters, group policy object permissions and policy-related permissions on SOMs, users and groups in the domain. The CreateEnvironment set of scripts also includes another script, that takes the configuration XML file (and any group policy object backups referenced in the XML file) and creates the group policy objects (with settings, if backups were specified in the xml), organizational units, links on SOMs to group policy objects, WMI filters, group policy object permissions and policy-related permissions on SOMs, users and groups specified in the target domain. The script allows specification of a migration table, to migrate the settings in the group policy object to settings appropriate for this new domain.

CONCLUSION

As can be seen from the foregoing detailed description, there is provided a method and system accessible via group policy management interfaces to manage group policies in a domain in an efficient manner. The interfaces make various functionalities accessible to administrators via a user interface and/or external programs such as script, thereby providing the ability to view and manage group policy in a domain while abstracting the complexity of such tasks. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving a request to manage security settings of a group policy data construct;
   generating a permissions table based on security information associated with the group policy data construct, wherein each row in the permissions table corresponds to a trustee that is at least one computer or at least one user, and each column in the permissions table corresponds to a directory service permission, wherein a plurality of cells in the permissions table contain data regarding an access state to a directory service, whether the access state is inherited, and whether the access state is inheritable, the access state in one of the plurality of cells of the permissions table being denied and the access state in another of the plurality of the cells of the permissions table being allowed;
   changing the permissions table to satisfy the request;
   saving security settings to the group policy data construct based on the changed permissions table; and
   performing a check of the permissions table to determine whether each access state is either in a state of allowed or in a state of denied.

2. The method of claim 1 wherein the group policy data construct comprises a group policy object.

3. The method of claim 1 wherein the group policy data construct comprises a scope of management object.

4. The method of claim 1 wherein the group policy data construct comprises a WMI filter.

5. The method of claim 1 wherein changing the permissions table includes adding a permission.

6. The method of claim 1 wherein changing the permissions table includes removing a permission.

7. A computer storage medium storing computer-executable instructions that, when executed, cause one or more processors to perform acts comprising:
   receiving a request to manage security settings of a group policy data construct;
   generating a permissions table based on security information associated with the group policy data construct, wherein each row in the permissions table corresponds to a trustee that is at least one computer or at least one user, and each column in the permissions table corresponds to a directory service permission, wherein a plurality of cells in the permissions table contain data regarding an access state to a directory service, whether the access state is inherited, and whether the access state is inheritable the access state in one of the plurality of cells of the permissions table being denied and the access state in another of the plurality of the cells of the permissions table being allowed;
   changing the permissions table to satisfy the request;
   saving security settings to the group policy data construct based on the changed permissions table; and
   performing a check of the permissions table to determine whether each access state is either in a state of allowed or in a state of denied.

8. The computer storage medium of claim 7 wherein the group policy data construct comprises a group policy object.

9. The computer storage medium of claim 7 wherein the group policy data construct comprises a scope of management object.

10. The computer storage medium of claim 7 wherein the group policy data construct comprises a WMI filter.

11. The computer storage medium of claim 7 wherein changing the permissions table includes adding a permission.

12. The computer storage medium of claim 7 wherein changing the permissions table includes removing a permission.

13. In a computing environment, a method comprising:
    receiving a request to manage security settings of a group policy data construct;
    generating a permissions table based on security information associated with the group policy data construct, wherein each row in the permissions table corresponds to a trustee that is a computer or a group of computers in a domain, and each column in the permissions table corresponds to a directory service permission, wherein a plurality of cells in the permissions table contain data regarding an access state, whether the access state is inherited, and whether the access state is inheritable;
    changing the permissions table to satisfy the request;
    saving security settings to the group policy data construct based on the changed permissions table; and
    performing a check of the permissions table to determine whether each access state is either in a state of allowed or in a state of denied.

* * * * *